(12) United States Patent
Cherp et al.

(10) Patent No.: US 11,941,109 B2
(45) Date of Patent: Mar. 26, 2024

(54) CUSTOMIZABLE AND DYNAMICALLY MUTABLE OPERATING SYSTEMS

(71) Applicant: CyberArk Software Ltd., Petach-Tikva (IL)

(72) Inventors: Mark Cherp, Petach-Tikva (IL); Nir Chako, Petach-Tikva (IL); Asaf Hecht, Tel Aviv (IL)

(73) Assignee: CYBERARK SOFTWARE LTD., Petach-Tikva (IL)

( * ) Notice: Subject to any disclaimer, the term of this patent is extended or adjusted under 35 U.S.C. 154(b) by 189 days.

(21) Appl. No.: 17/645,438

(22) Filed: Dec. 21, 2021

(65) Prior Publication Data
US 2023/0195883 A1    Jun. 22, 2023

(51) Int. Cl.
*G06F 9/4401* (2018.01)
*G06F 21/53* (2013.01)
*H04L 9/08* (2006.01)

(52) U.S. Cl.
CPC ............ *G06F 21/53* (2013.01); *G06F 9/4406* (2013.01); *H04L 9/0861* (2013.01); *H04L 9/0894* (2013.01); *G06F 2221/034* (2013.01)

(58) Field of Classification Search
CPC .................................................. G06F 9/4401
See application file for complete search history.

(56) References Cited

U.S. PATENT DOCUMENTS

| | | | |
|---|---|---|---|
| 5,809,145 A | * | 9/1998 | Slik .................. H04L 69/04 705/52 |
| 8,479,286 B2 | | 7/2013 | Dalcher et al. |
| 2005/0262342 A1 | * | 11/2005 | Field .................. G06F 12/126 711/E12.075 |
| 2006/0282827 A1 | | 12/2006 | Yeap et al. |

(Continued)

FOREIGN PATENT DOCUMENTS

WO    2013002777 A1    1/2013

OTHER PUBLICATIONS

X. Yang and M. Zulkernine, "Security Monitoring of Components Using Aspects and Contracts in Wrappers," 2011 IEEE 35th Annual Computer Software and Applications Conference, Munich, Germany, 2011, pp. 566-575 (Year: 2011).

*Primary Examiner* — Phil K Nguyen
(74) *Attorney, Agent, or Firm* — FINNEGAN, HENDERSON, FARABOW, GARRETT & DUNNER, LLP

(57) ABSTRACT

Described herein are methods, systems, and computer-readable storage media for generation of a secure and dynamically mutable operating system. Techniques include receiving a request to execute an application causing instantiation of an operating system by identifying one or more needed modules that include core kernel modules and operating system service modules that are dynamically plugged-in or unplugged based on the execution of the application. Techniques may further include assigning a separate memory space with a separate virtual address for each of the one or (Continued)

more modules, generating a unique cryptographic key for each of the one or more modules, storing each virtual address and corresponding unique cryptographic key together. Further the operating system generation system encrypts each of the one or more modules using their corresponding unique cryptographic key.

20 Claims, 15 Drawing Sheets

(56) References Cited

U.S. PATENT DOCUMENTS

| | | | |
|---|---|---|---|
| 2008/0250251 A1* | 10/2008 | Lin | G06F 21/10 |
| | | | 713/189 |
| 2013/0039491 A1* | 2/2013 | Unagami | G06F 21/575 |
| | | | 380/44 |
| 2013/0198527 A1* | 8/2013 | Lu | G06F 21/12 |
| | | | 713/189 |
| 2013/0254884 A1 | 9/2013 | Dalcher et al. | |
| 2015/0006909 A1* | 1/2015 | Ogawa | G06F 21/14 |
| | | | 713/189 |
| 2016/0094555 A1* | 3/2016 | Kiperberg | H04L 63/0435 |
| | | | 713/190 |
| 2016/0253520 A1* | 9/2016 | Moon | H04L 9/0819 |
| | | | 713/190 |
| 2020/0104495 A1* | 4/2020 | Schack | G06F 21/565 |
| 2022/0035750 A1* | 2/2022 | O'Brien, III | G06F 12/0646 |

\* cited by examiner

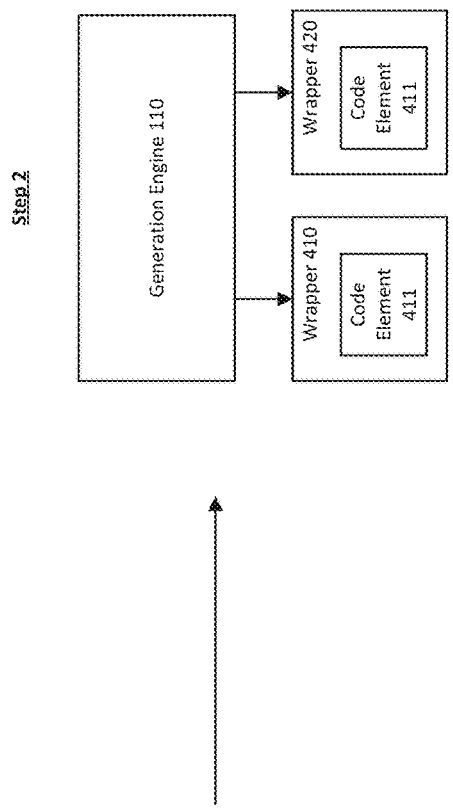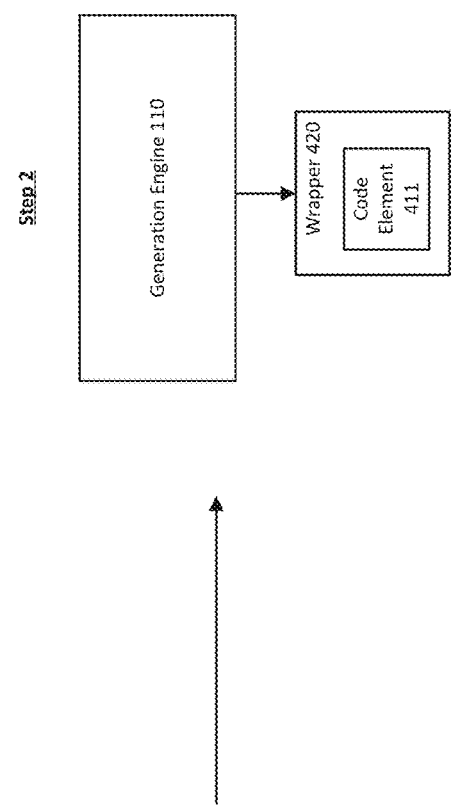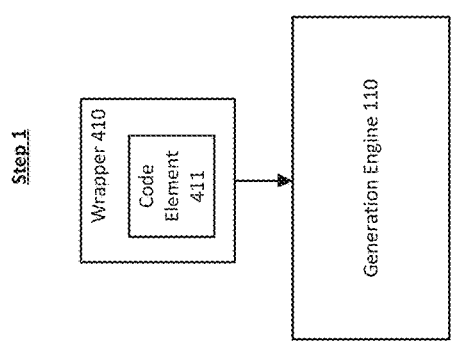

CUSTOMIZABLE AND DYNAMICALLY MUTABLE OPERATING SYSTEMS

TECHNICAL FIELD

This disclosure relates to secure execution of applications in dynamically generated operating system execution environments. In some embodiments, for example, this disclosure relates to systems and methods for secure spaces for storage and execution of various functionality needed by application executing in dynamically generated operating system execution environment to avoid access to restricted functionality by malicious actors.

BACKGROUND

Applications executing on execution environments may be developed by various sources and may continuously evolve. Such complex and dynamically updating software code needs to be regularly evaluated for providing secure execution environments, including computing hardware and operating systems, shared hardware, and operating systems. Execution environments may determine the impact on their performance or the security impact caused by execution of applications. Such evaluation of impact to performance and security is delayed.

The safety of the execution environments may be achieved by executing the applications in isolated execution environments that may include all possible functionality requested by the applications. Such execution environments may result in expensive hardware and operating systems that may be underutilized. Further, the cost for communication between processes of applications can be high. Alternatively, trusted applications can use a lightweight single memory space kernel such as unikernel to avoid isolated processes for each functionality. But any potential malicious actors can introduce code that now has access to processes of all possible functionality, increasing security risk.

Thus, there are needs for technological solutions to dynamically manage execution environments that are secure but at the same time lightweight to seamlessly switch between execution environments to execute software code. Such solutions would advantageously help prevent malicious code elements that are requesting or accessing functionality from impacting the execution environment. Furthermore, there are technological needs to have a secure execution environment with mutable operating systems and wrapped software code, both dynamically generated, to limit access to execution environment features and safeguard against any performance and security breaches. Further technical improvements are described in the example embodiments below.

SUMMARY

Certain embodiments of the present disclosure relate to a non-transitory computer readable medium including instructions that are executable by at least one processor to perform operations for generation of a secure and dynamically mutable operating system. The operations can include receiving a request to execute an application, instantiating an operating system for execution of the application, wherein the operating system instantiation includes identifying one or more modules needed to execute the application, wherein the identified one or more modules include core kernel modules and operating system service modules that are dynamically plugged-in or unplugged based on the execution of the application, assigning a separate memory space for each of the one or more modules, wherein each separate memory space is assigned a separate virtual address, generating a unique cryptographic key for each of the one or more modules, storing each virtual address and corresponding unique cryptographic key together, and encrypting each of the one or more modules using their corresponding unique cryptographic key.

According to some disclosed embodiments, the one or more operating system service modules can be unplugged within a threshold period.

According to some disclosed embodiments, instantiating the operating system for execution of the application further comprises executing each of the one or more modules as separate processes.

According to some disclosed embodiments, identifying the one or more modules needed to execute the application further comprises:
identifying an operating system functionality required by the application, and generating a bundle for the identified operating system functionality.

According to some disclosed embodiments, generating the bundle for the identified operating system functionality comprises generating the bundle on a just-in-time basis.

According to some disclosed embodiments, the core kernel modules include default modules included in the instantiated operating system.

According to some disclosed embodiments, the receipt of the request to execute the application includes a request to store updates to the application.

According to some disclosed embodiments, the identification of the one or more modules needed for execution of the application is based on a confidence score.

According to some disclosed embodiments, the core kernel modules and operating system service modules that are dynamically plugged-in or unplugged based on the execution of the application are dynamically plugged-in or unplugged based on an impact to performance of the operating system upon inclusion of the identified one or more modules.

According to some disclosed embodiments, the core kernel modules and operating system service modules that are dynamically plugged-in or unplugged based on the execution of the application are dynamically plugged-in or unplugged based on an impact to security of the operating system upon inclusion of the identified one or more modules.

According to some disclosed embodiments, an operating system service module of the operating system service modules auto-terminates.

According to some disclosed embodiments, storing each virtual address and corresponding unique cryptographic key together further comprises storing the unique cryptographic key in association with the core kernel modules of the operating system.

According to some disclosed embodiments, the operations can further include monitoring capabilities accessed by the executing application, determining accessed capabilities not identified during instantiation of the operating system, wherein the determined capabilities are determined based on the identified one or more modules of the operating system, analyzing the determined capabilities accessed by the executing application, and mitigating the determined capabilities, wherein the mitigation is based on the analysis of the determined capabilities.

Certain embodiments of the present disclosure relate to a computer implemented method for dynamically configuring and deploying customizable secure wrappers. The method can include receiving a request to execute an application, instantiating an operating system for execution of the application wherein the operating system instantiation includes identifying one or more modules needed to execute the application, wherein the identified one or more modules include core kernel modules and operating system service modules that are dynamically plugged-in or unplugged based on the execution of the application, assigning a separate memory space for each of the one or more modules, wherein each separate memory space is assigned a separate virtual address, generating a unique cryptographic key for each of the one or more modules, storing each virtual address and corresponding unique cryptographic key together, and encrypting each of the one or more modules using their corresponding unique cryptographic key.

According to some disclosed embodiments, the one or more operating system service modules can be unplugged within a threshold period.

According to some disclosed embodiments, instantiating the operating system for execution of the application further comprises executing each of the one or more modules as separate processes.

According to some disclosed embodiments, identifying the one or more modules needed to execute the application can further include identifying an operating system functionality required by the application, and generating a bundle for the identified operating system functionality.

According to some disclosed embodiments, generating the bundle for the identified operating system functionality comprises generating the bundle on a just-in-time basis.

According to some disclosed embodiments, the method can further include monitoring capabilities accessed by the executing application, determining accessed capabilities not identified during instantiation of the operating system, wherein the determined capabilities are determined based on the identified one or more modules of the operating system, analyzing the determined capabilities accessed by the executing application, and mitigating the determined capabilities, wherein the mitigation is based on the analysis of the determined capabilities.

Certain embodiments of the present disclosure relate to a secure and dynamic operating system generation system. The secure and dynamic operating system generation system can include one or more memory devices storing processor-executable instructions, and one or more processors configured to execute the instructions to cause the secure and dynamic operating system generation system to perform operations. The operations can include receiving a request to execute an application, instantiating an operating system for execution of the application, wherein the operating system instantiation includes identifying one or more modules needed to execute the application, wherein the identified one or more modules include core kernel modules and operating system service modules that are dynamically plugged-in or unplugged based on the execution of the application, assigning a separate memory space for each of the one or more modules, wherein each separate memory space is assigned a separate virtual address, generating a unique cryptographic key for each of the one or more modules, storing each virtual address and corresponding unique cryptographic key together, and encrypting each of the one or more modules using their unique corresponding cryptographic key.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIGS. 4A-B show transitions of wrappers for code elements, according to some embodiments of the present disclosure.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof may occur or be performed simultaneously, at the same point in time, or concurrently. Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms, thus, cover both active forms, and passive forms, of sending and receiving.

Systems and methods consistent with the present disclosure are directed to secure and efficient execution environments for the execution of applications. Systems and methods described below include techniques of wrapping code elements of an application. In some embodiments, the disclosed techniques include securing operating system modules in separate memory spaces encrypted using cryptographic keys. As described below, secure execution management techniques with wrapped code elements and mutable operating systems can result in various technological improvements in the security of the underlying system, hardware, and software, and other applications executing on the underlying hardware and software.

Figure 1:
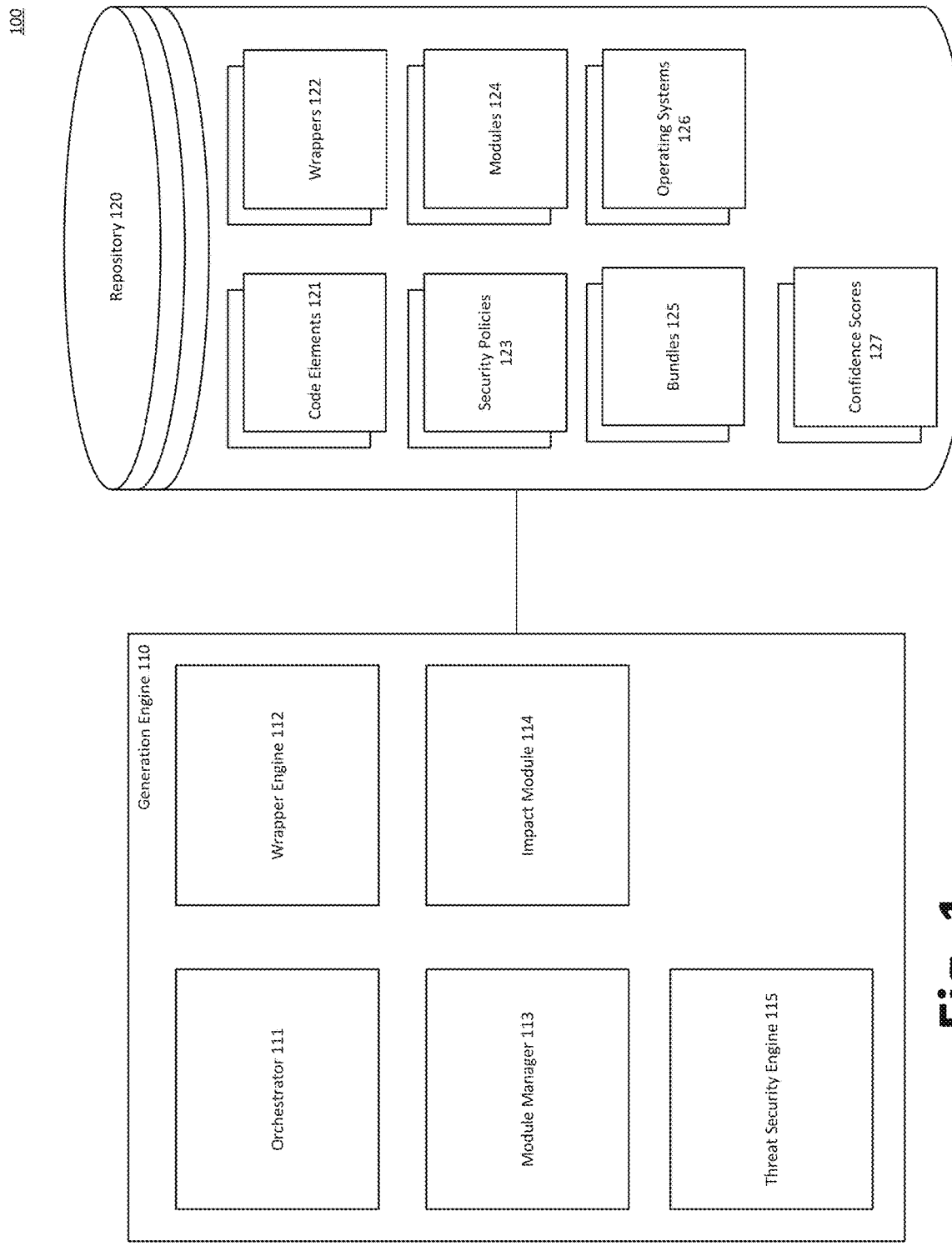
FIG. 1 is a block diagram showing various exemplary components of a code execution management system, according to some embodiments of the present disclosure.

FIG. 1 is a block diagram showing various exemplary components of a code execution management system 100 for the execution of software code, securely and efficiently, according to some embodiments of the present disclosure. Code execution management system 100's components may comprise a generation engine 110 and repository 120 involved in the generation of an execution environment with abilities to execute software code securely and efficiently. Generation engine 110 may generate execution environments by instantiating operating systems and modules to include with an operating system and generating wrappers to execute code elements over the operating systems securely. Repository 120 may include various components needed to instantiate operating systems and generate wrappers for code elements and manage both operating systems and their modules and wrappers surrounding code elements.

As illustrated in FIG. 1, generation engine 110 may include orchestrator 111, wrapper engine 112, module manager 113, impact module 114, and threat security engine 115 to identity, transform, monitor, and manage execution environments. Repository 120 may include code elements 121 of various software applications whose execution environment needs to be generated and managed by code execution management system 100. Repository 120 may also include wrappers 122 and security policies 123 used to wrap software code in code elements 121 to execute in a secure manner and policies to handle any potential security breaches. Repository 120 may also include modules 124, bundles 125, and operating systems 126 to provide a customized execution environment with needed functionality defined using modules and bundles included with the operating systems. Repository 120 may also include confidence scores 127 to help determine the confidence levels of a secure environment with the introduction of various modules 124 and bundles 125 in operating systems 126. In some embodiments, confidence scores 127 may be used to determine confidence levels of code elements 121 executing in a secure execution environment. Confidence scores 127 may also be used to determine confidence levels of wrappers 122 wrapping code elements 121 and including abilities to access operating systems 126 functionalities.

Orchestrator 111 may be used to manage the selection of an execution environment for execution of code elements 121. Selection of an execution environment may include selecting an operating system of operating systems 126, and instantiation of operating systems 126 using modules 124 or bundles 125. Selection of an execution environment may also include setup of a wrapper of wrappers 122 to wrap code elements 121 to safely execute software code in a selected and instantiated operating system of operating systems 126.

Orchestrator 111 may select execution environments generated on a just-in-time basis. Orchestrator 111 may share the requirements for an execution environment with other components of code execution management system 100 to dynamically set up the required execution environment. Code execution management system 100 may set up a wrapper of wrappers 122 based on selected and instantiated operating systems of operating systems 126 and included modules of modules 124 and bundles of bundles 125. Orchestrator 111 may provide an existing execution environment to generate a modified execution environment with an updated operating system with updated modules, bundles, and wrappers for code elements.

Orchestrator 111 may use a wrapper of wrappers 122 to wrap software code in code elements 121 to execute the software code securely. Orchestrator 111 may select an already existing wrapper from wrappers 122 or may generate a new wrapper. Code execution management system 100 may generate a new wrapper by updating an existing wrapper of wrappers 122.

Wrapper engine 112 may help generate new wrappers for wrapping code elements 121 to execute wrapped software code securely. Wrapper engine 112 helps in the generation of wrappers 122 and transformation of wrappers 122. Wrapper engine 112 may transform wrappers 122 based on the needs of the wrapped code elements. A detailed description of the transformation of wrappers 122 is provided in FIGS. 5A-B descriptions below. Wrapper engine 112 may transition between different states, including code elements with matching requirements for a secure execution environment. A detailed description of the transition of wrappers (e.g., wrappers 122) between different states is provided in detail in FIGS. 4A-B descriptions below.

Wrapper engine 112 may work with other components of generation engine 110 to evaluate the effect of code elements (e.g., code elements 121) on the generated execution environment. Wrapper engine 112 may use impact module 114 and threat security engine 115 to evaluate the execution of the wrapped software code (e.g., code elements 121) and its impact on the execution environment and underlying hardware and other software code running on the underlying hardware. A detailed description of wrapper engine 112 is provided in FIG. 2A description below.

Module manager 113 may manage the selection and inclusion of modules as part of the instantiation of an operating system of operating systems 126. Module manager 113 may help select modules of modules 124 to include with an operating system. Module manager 113 may select modules based on operating system functionality expected by a code element of code elements 121 requested for execution. Module manager 113 may also manage groupings of modules in modules 124 as bundles 125. Module manager 113 may keep track of modules 124 dynamically added and removed from operating systems 126. Components of module manager 113 used for managing modules 124, bundles 125, and operating systems 126 to generate and manage execution environments are described in detail in FIG. 2B description below.

Impact module 114 may help determine the impact of code elements 121 on execution environments setup using operating systems 126. Impact module 114 may determine the impact of code elements 121 by determining the impact on modules 124. Impact module 114 may conduct the impact assessment of a code element of code elements 121 on operating systems 126 prior to the actual execution of code elements 121. Impact assessment of impact module 114 may be used by module manager 113 to determine which modules of modules 124 and bundles of bundles 125 are to be included when instantiating an operating system of operating systems 126. Code execution management system 100 may use impact assessment generated by impact module 114 to manage execution environments and code elements (e.g., code elements 121) executing in the execution environments. Code execution management system 100 may also use impact assessment to determine triggering events to add or remove modules 124 and bundles 125 from operating systems 126. Trigger events may include the amount of time or access to certain features of an operating system or the underlying hardware. Module manager 113 may also impact assessment to determine which modules of 124 to be bundled and stored in bundles 125 to be used together.

Threat security engine 115 may help report various potential threats that may occur during the execution of code elements 121 in execution environments, including operating systems 126 and generated by generation engine 110 with the help of orchestrator 111, wrapper engine 112, and module manager 113. Threat security engine 115 reports may be utilized by generation engine 110 to dynamically manage the execution environment by terminating an incorrectly utilized module by code elements 121. In some embodiments, threat security engine 115 reports may be used by generation engine 110 to generate wrappers of wrappers 122 restricting access to modules of modules 124 included in an operating system of operating systems 126 executing a code element of code elements 121. Code execution management system 100 may use reports generated by threat security engine 115 to update security policies 123.

Generation engine 110 may utilize its components described above with various components of repository 120 to generate and manage code execution environments. In various embodiments, repository 120 may take several different forms. For example, repository 120 may be an SQL database or NoSQL database, such as those developed by MICROSOFT™, REDIS, ORACLE™, CASSANDRA, MYSQL, various other types of databases, data returned by calling a web service, data returned by calling a computational function, sensor data, IoT devices, or various other data sources. Repository 120 may store data that is used or generated during the operation of applications, such as generation engine 110 or its components. For example, if generation engine 110 is configured to generate wrappers specific to certain software code elements, such as code elements 121, repository 120 may store the generated wrappers in wrappers 122.

Similarly, if generation engine 110 is configured to provide a previously generated wrapper, generation engine 110 may retrieve previously generated wrappers (e.g., wrappers 122) associated with a code element and other related data stored in repository 120. In some embodiments, repository 120 may be fed data from an external source, or the external source (e.g., server, database, sensors, IoT devices, etc.) may be a replacement. An external source may connect to repository 120 over a network (not shown in FIG. 1).

The network may take various forms. For example, the network may include or utilize the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, or other types of network communications. In some embodiments, the network may include an on-premises (e.g., LAN) network, while in other embodiments, the network may include a virtualized (e.g., AWS™, Azure™, IBM Cloud™, etc.) network. Further, the network may in some embodiments, be a hybrid on-premises and virtualized network, including components of both types of network architecture.

Code elements 121 and wrappers 122 may be provided by generation engine 110 to store in repository 120. In some embodiments, code elements 121 and wrappers 122 may be provided directly by a third-party software service or hardware. Repository 120 may maintain relationships between code elements 121 and wrappers 122. The relations may describe which wrappers of wrappers 122 may be used by code execution management system 100 to wrap a code element of code elements 121 for secure execution of the wrapped code element.

Wrappers 122 may include software wrappers generated using generation engine 110 to wrap code elements 121. Wrappers 122 may wrap code elements 121 to shield them from improperly accessing functionalities of execution environment managed by code execution management system 100. Wrapper engine 112 may transform existing wrappers (e.g., wrappers 122) to generate new wrappers. A detailed description of the transformation of wrappers 122 is presented in FIGS. 5A-B description below. A code element of code elements 121 may be mapped to a wrapper based on identified functionality needed when executing the code element.

Code execution management system 100 may assess the functionality needs of a code element based on defined trigger events. For example, code execution management system 100 may assess the functionality needs of a code element when a code element is updated. Code execution management system 100 may be part of a continuous integration system reviewing updates to code elements forming a software and update execution environment. Updates to an execution environment may include generating and updating wrappers (e.g., wrappers 122) of code elements (e.g., code elements 121) and updating underlying operating systems. A detailed description of the process of instantiation and transformation of operating systems is provided in FIGS. 8-9 description below. Code execution management system 100 may allow customized trigger events to assess the functionality needs of code elements 121. A user of code execution management system 100 may be allowed to provide inputs for customizing functionality assessment settings. For example, code execution management system 100 may be customized to assess the functionality needs of each code element of code elements 121 at regular intervals.

Code execution management system 100 may transition from one wrapper to another to wrap code in code elements 121 for new functionality needs of a code element of code elements 121. A detailed description of the transition of wrappers is presented in FIGS. 4A-B descriptions below.

Security policies 123 may include various security policies followed by code execution management system 100 when generating wrappers of wrappers 122 and instantiating operating systems of operating systems 126. In some embodiments, code execution management system 100 may utilize security policies 123 when monitoring the execution of code elements 121 in execution environments generated using generation engine 110. Threat security engine 115 may use security policies 123 to determine any breaches in security as defined in security policies 123. Threat security engine 115 may also use security policies 123 to determine security impact scores and, in turn, confidence scores 127.

Modules 124 may include software to provide specific functionality to operating systems 126. Modules 124 may include core kernel modules included by default when instantiating an operating system. Modules 124 may also include optional service modules that may be included with an operating system when setting up an execution environment for code elements 121. Code execution management system 100 may dynamically plug modules 124 into operating systems 126. Code execution management system 100 may dynamically plug and unplug based on trigger events. For example, code execution management system 100 may unplug a module upon reaching a threshold period.

Modules 124 may be software to expose operating system functionality to third-party software code, such as code elements 121. Modules 124 may be a driver that can access hardware features, for example, a USB port or network interface to access data from an external device. In some embodiments, modules 124 may be software libraries to add common functionality various applications use, such as code elements 121. For example, modules 124 may include web and application servers such as NodeJS, Nginx, etc.

Bundles 125 may include a grouping of modules (e.g., modules 124). Bundles 125 may group modules based on dependencies between modules to provide a functionality of an operating system. In some embodiments, bundles 125 may include various abilities to handle one more functionality of an operating system. In some embodiments, a bundle in bundles 125 may depend on other bundles in bundles 125. In some embodiments, the dependencies between modules (e.g., modules 124) and bundles (e.g., bundles 125) may be maintained by a bundle manager (not shown in FIG. 1), such as yum, dpkg, aptitude package managers available in various flavors of Linux operating system.

Operating systems 126 may include images of an operating system, such as an ISO, generated for providing an execution environment to execute code elements 121. In some embodiments, operating systems 126 may include a configuration file to generate an instance of an operating system. For example, a configuration file can be a saltstack salt configuration file describing the execution environment. Code execution management system 100 may use generation engine 110 to parse the configuration file to instantiate an execution environment with defined operating system features. Operating systems 126 act as execution environments for executing applications such as code elements 121. Operating systems 126 provide the functionality needed by code elements 121 using modules 124 and bundles 125 included with operating systems 126. Modules 124 and bundles 125 may be included during the initialization of operating systems 126 or dynamically during the execution of code elements 121.

Operating systems 126 may be complete operating systems with user space and kernel space. In some embodiments, operating systems may be a microkernel with minimal features. Code execution management system 100 may execute software applications of different users on different microkernel type operating systems (e.g., operating systems 126). In some embodiments, operating systems 126 may execute multiple software applications belonging to different users as different processes with no process isolation. For example, an operating system can be a unikernel with a single address space for running multiple processes belonging to multiple users.

Code execution management system 100 may generate execution environments with custom operating systems for each application. For example, a separate operating system of operating systems 126 may be defined and instantiated for each code element of code elements 121. Generation engine 110 may store the custom operating systems in repository 120 as operating systems 126. Operating systems 126 may execute on top of a hypervisor (e.g., KVM, Xen, vSphere, etc.) to present an execution environment to execute code elements 121. Operating systems 126 may expose functionality, including access to underlying virtual and physical hardware using modules 124 and bundles 125. Code execution management system 100 may use wrappers 122 to regulate code elements 121 from accessing available operating system functionality.

Custom operating systems (e.g., operating systems 126) may execute user applications (e.g., code elements 121) managed by code execution management system 100 as an isolated process. In some embodiments, custom operating systems may execute modules of modules 124 as isolated processes in separate memory spaces. A detailed description of an example process of generation of custom operating systems is presented in the descriptions of FIGS. 8-10 below.

Confidence scores 127 may include scores of the level of impact each module of modules 124 and bundle of bundles 125 have on each operating system of operating systems 126. In some embodiments, confidence scores 127 may be associated with code elements 121 to help understand the execution environment's potential performance and security impact. Accordingly, confidence scores 127 associated with code elements 121 may help select appropriate wrappers 122 to reduce impact. In some embodiments, confidence scores 127 may also help select modules 124 and bundles 25 to use with operating systems 126.

Impact module 113 of generation engine 110 may calculate confidence scores 127 based on each bundle of bundles 125 included in an operating system instance of operating systems 126. Confidence scores 127 may be calculated by aggregating multiple confidence scores calculated for different kinds of impact. For example, confidence scores can include a bundle's impact on the performance of an operating system, such as CPU and memory usage levels and network speeds. In another scenario, confidence scores can include a bundle's impact on the security of the execution environment and, in turn, the underlying operating system. For example, the confidence score can be based on security risks, such as the number of open ports and the type of communication protocols (secure and unsecure) used over the opened ports.

Figure 2A:
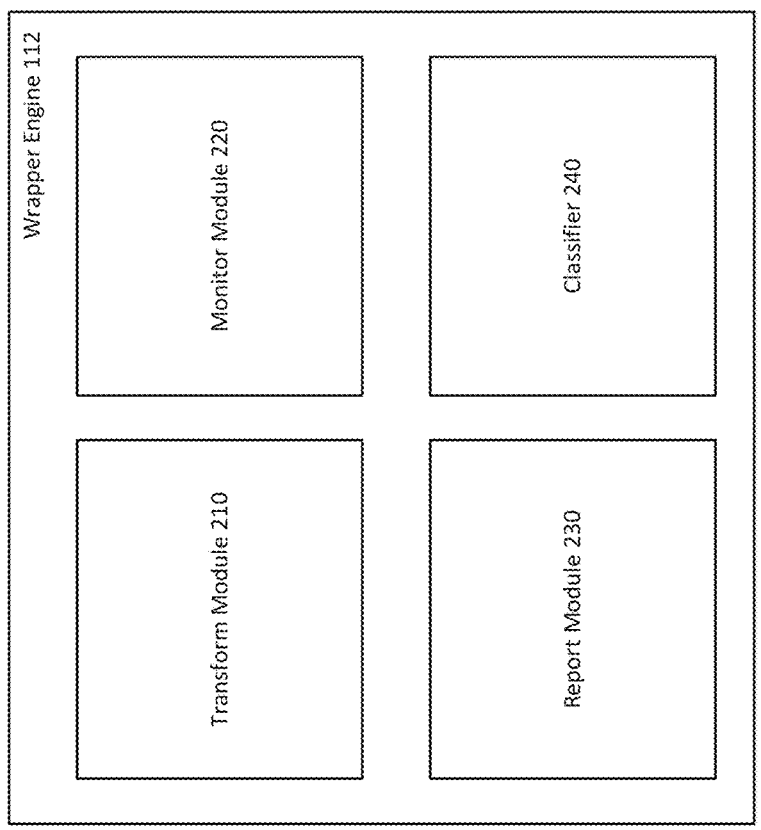
FIG. 2A shows an exemplary wrapper engine, according to some embodiments of the present disclosure.

FIG. 2A shows an exemplary wrapper engine 112, according to some embodiments of the present disclosure. Wrapper engine 112 may be used to transform and observe the behaviors of various software, including code elements 121 and operating systems 126. As illustrated in FIG. 2A, wrapper engine 112 may include transform module 210, monitor module 220, report module 230, and classifier 240 to help transform various components of an execution environment to execute code elements 121. Wrapper engine 112 may transform code elements received by code execution management system 100 to execute on an execution environment instantiated by code execution management system 100. Wrapper engine 112 may transform code elements of code elements 121 to run them securely and efficiently in execution environments provided by operating systems of operating systems 126. Wrapper engine 112 may also transform execution environments such as operating systems 126 to securely and efficiently execute applications (e.g., code elements 121 of FIG. 1) on them. A detailed description of the processes of transformation of an operating system is provided in FIGS. 8-10 descriptions below.

Transform module 210 may help transform a wrapper to have the appropriate ability to execute a code element. In some embodiments, transform module 210 may update the abilities of an existing wrapper to allow the execution of a code element. A detailed description of configuring a wrapper's abilities is provided in FIGS. 5A-B descriptions below. Transform module 210 may begin by selecting a default wrapper and transforming it to provide an execution environment for a code element. Transform module 210 may transform a wrapper by reviewing the functionality expected by a code element. In some embodiments, transform module 210 may generate a wrapper based on a user-provided configuration. In some embodiments, transform module 210 may receive a wrapper and code element to review and confirm if the wrapper can help provide access to the required functionality for executing the code element. Transform module 210 may include abilities in wrappers 122 for code elements 121 to access the needed functionality in the execution environment. In some embodiments, transform module 210 may limit wrappers 122's abilities for post-reviewing code elements (e.g., code elements 121 of FIG. 1). For example, transform module 210 may drop abilities that code elements should not use to access operating system functionality in certain circumstances, such as the ability to access an external data server over an unsecure protocol. Transform module 210 may regulate wrapper abilities based on security policies (e.g., security policies 123 of FIG. 1). In the above scenario, a security policy limiting all external communications to secure protocols may cause transform module 210 to remove abilities to communicate with external servers when an unsecure port (for example, HTTP) was requested to be opened by an executing code element.

Transform module 210 may transform an operating system of operating systems 126 by including modules of modules 1254 (as shown in FIG. 1) and bundles 125 (as shown in FIG. 1). Transform module 210 may further transform by initializing an operating system secure execution environment by providing separate memory space for executing various software such as code elements 121, modules 124, bundles 125. In some embodiments, transform module 210 may help generate cryptographic keys to encrypt allocated separate memory spaces for restricting access to memory spaces used during software execution in an execution environment made of the transformed operating system. The encrypted memory spaces may restrict unauthorized access by code elements for functionality exposed by a module included in the operating system. The encrypted memory spaces also allow multiple transformed operating systems to provide multiple execution environments in a single chunk of memory. Code execution management system 100 may manage these multiple execution environments. Encrypted memory spaces can help achieve process isolation in unikernel based operating systems (e.g., operating systems 126 of FIG. 1) and simultaneously have the ability, like microkernels executing applications separately. In addition, code execution management system 100 with encrypted memory spaces for separate processes avoids the overload of multiple microkernels executing individual applications to achieve process isolation.

Monitor module 220 may help monitor a wrapper of wrappers 122 generated by transform module 210 by observing the interaction of an executing code element of code elements 121 wrapped using the wrapper. Monitor module 220 may provide feedback to code execution management system 100 to further transform execution environments, including a wrapper of wrappers 122 (as shown in FIG. 1) and operating systems of operating systems 126. Code execution management system 100 may request transform module 210 to help further transform execution environments by transforming wrappers (e.g., wrappers 122 of FIG. 1) around the executing code element and underlying operating systems (e.g., operating systems 126 of FIG. 1).

Monitor module 220 may monitor code element interactions in the form of calls to access operating system functionality. In particular, monitor module 220 may monitor calls to modules (e.g., modules 124) exposing operating system functionalities. In some embodiments, a wrapper is a lightweight Unix kernel, such as a Docker™ container or a Unikernel for accessing hardware directly. In such a scenario, monitor module 220 may monitor a code element access behavior to hardware functionality.

Monitor module 220 may observe code elements' (e.g., code elements 121) access to various modules (e.g., modules 124) of operating systems (e.g., operating systems 126). Monitor module 220 may determine whether the accessed module for mentioned functionality is the approved module for the code element currently executed on the operating system. Wrappers 122 may help limit the modules accessed by code elements. Monitor module 220 may communicate with wrappers 122 to determine any unauthorized module access by code elements 121. Monitor module 220 may restrict unauthorized access to modules by code elements 121. In some embodiments, monitor module 220 may report the unauthorized accesses to report module 230.

Report module 230 may help report results of monitoring an execution environment for evaluation and/or impose restrictions on the code element. Report module 230 may generate a report and send it to, for example, a security application external to code execution management system 100. Report module 230 may also share an analyzed report of unauthorized access of a code element internally to impact module 114 to determine the potential impact scores of similar code elements.

Classifier 240 may classify code elements 121 as trusted or untrusted based on code elements behavior when accessing module (e.g., modules 124 of FIG. 1) of an operating system as reported by report module 230. Classifier 240 may include a machine learning model trained using the interaction logs of code elements (e.g., code elements 121) provided by monitor module 220. In some embodiments, classifier 240's machine learning model may be trained using analyzed reports provided by report module 230. Classifier 240 may utilize other meta-information associated with the code elements 121 to classify code elements 121. For example, classifier 240 may use the developer entity associated with code elements to determine trust levels. In this example, certain code elements with high impact scores may be considered trusted based on the developer entity who developed the code element.

Figure 2B:
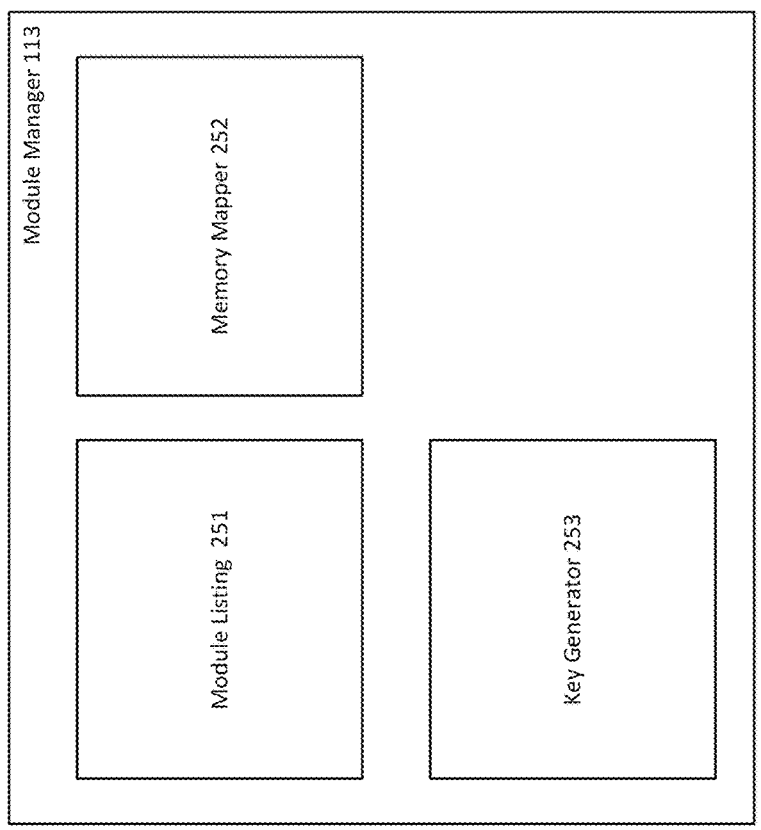
FIG. 2B shows an exemplary module manager, according to some embodiments of the present disclosure.

FIG. 2B shows an exemplary module manager, according to some embodiments of the present disclosure. Similar to wrapper engine 112, module manager 113 helps set up an execution environment for software code, including code elements 121. As illustrated in FIG. 2B, module manager 113 may include a module listing 251, memory mapper 252, and key generator 253.

Module listing 251 may manage a listing of modules (e.g., modules 124 of FIG. 1) included in an operating system of operating systems 126 (as shown in FIG. 1). In some embodiments, module listing 251 may include sub-lists of core kernel modules and optional service modules. Module listing 251 may update a list of modules associated with an operating system of operating systems 126 (as shown in FIG. 1) based on the execution behavior of code elements (e.g., code elements 121). Module listing 251 may update lists of modules included with operating systems executing code elements similar to the code element whose behavior is currently being analyzed by code execution management system 100. Module listing 251 may dynamically update the listing of modules associated with an operating system while executing a code element. In some embodiments, module listing 251 management of listing of modules may be configured using configuration files. For example, code execution management system 100 (as shown in FIG. 1) may request module listing 251 to update a list of modules based on trigger events, such as a threshold impact score or interval of time. Module listing 251 may work with transform module 210 (as shown in FIG. 2A) to transform an operating system based on an updated listing of modules associated with the operating system.

Module listing 251 may update a list associated with an operating system of operating systems 126 with additional modules when a code element of code elements 121 (as shown in FIG. 1) executed on the operating system requires access to certain operating system functionality. Module listing 251 may use wrapper engine 112 (as shown in FIG. 2A) to determine modules of modules 124 (as shown in FIG. 1) needed for requested operating system functionality.

Module listing 251 may also manage dependencies within a list of modules associated with an operating system. In some embodiments, module listing 251 may also manage the generation of bundles (e.g., bundles 125 of FIG. 1) of dependent modules by combining them as a bundle. Module listing 251 may include sub-lists of bundles associated with an operating system.

Memory mapper 252 may help map different modules (e.g., modules 124 of FIG. 1) in different parts of a memory space included with an operating system of operating systems 126. Memory mapper 252 may manage memory locations of listings of modules provided by module listing 251. Memory mapper 252 may include tables with addresses of memory locations and identifiers of modules from a list of modules managed by module listing 251. Memory mapper 252 may also manage the mapping between code elements (e.g., code elements 121 of FIG. 1) memory locations of modules (e.g., modules 124).

Key generator 253 may be used to generate cryptographic keys to encrypt memory locations used by modules (e.g., modules 124). Key generator 253 may also manage keys needed to access various memory locations assigned to modules included with an operating system of operating systems 126. Memory mapper 252 may access cryptographic keys generated and managed by key generator 253 to encrypt and decrypt memory spaces containing modules 124. In some embodiments, encrypted memory spaces may include code accessed using modules (e.g., modules 124) included with an operating system. In some embodiments, encrypted memory spaces may include content used by code elements 121 and modules 124.

Figure 3:
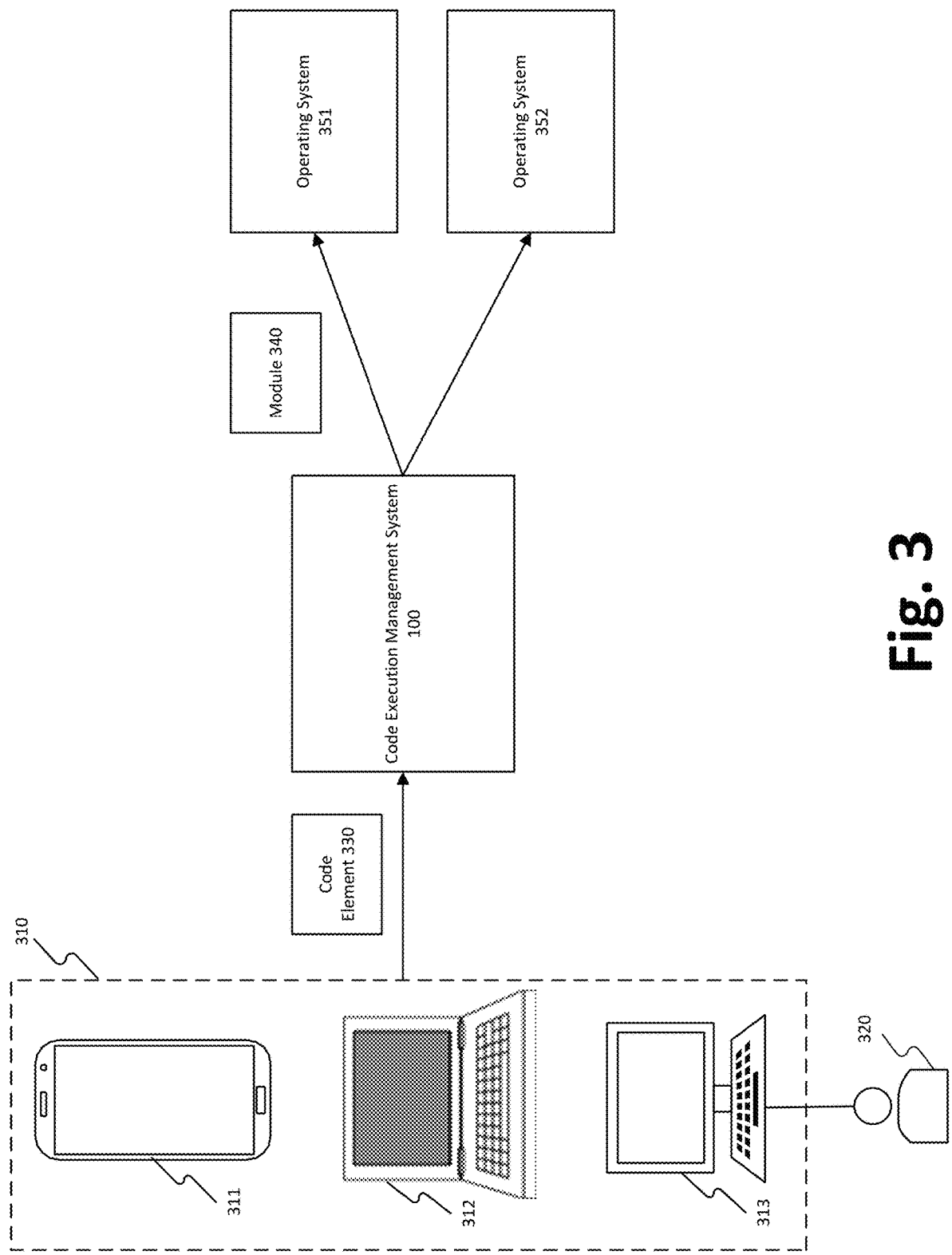
FIG. 3 shows an exemplary usage of a code execution management system of FIG. 1, according to some embodiments of the present disclosure.

FIG. 3 shows an exemplary usage of code execution management system 100 of FIG. 1, according to some embodiments of the present disclosure. As illustrated in FIG. 3, code execution management system 100 may generate a mutable operating system with multiple modules included in each of them. User devices 310 may be used by user 320 to request code execution management system 100 to generate various versions of operating systems as required to execute code elements, such as code element 330. For example, code execution management system 100 may generate operating systems 351 and 352 based on code element 330.

Code execution management system 100 may receive an update to the application in the form of code element 330, causing it to evaluate and determine the updates to the operating system executing code element 330. Code execution management system 100 may transform an operating system, for example, operating system 351, by introducing module 340 to execute code element 330. In some embodiments, code execution management system 100 may need to initialize operating system 351 and add module 340 for executing code element 330. Code execution management system 100 may switch out operating system 352 with operating system 351 upon receiving code element 330 as an update to the software application executed previously on operating system 351. Code execution management system 100 may utilize various components of generation engine 110 (as shown in FIG. 1) to transform operating system 352 to include module 340. User 320 may trigger code execution management system 100 to generate operating system 352 by supplying code element 330. Code execution management system 100 may generate operating system 352 with module 340 to provide the functionality needed by code element 330. Operating systems 351 and 352 generated by code execution management system 100 may be presented as services accessible to execute the functions of code element 330.

FIGS. 4A-B show the transition of wrappers for code elements, according to some embodiments of the present disclosure. As illustrated in FIGS. 4A-B, wrapper transitions to execute all functions of code element 411 may begin with existing wrapper 410 wrapping code element 411, as shown in step 1. Wrapper 410 and code element 411 are supplied to generation engine 110 to help transition to a new wrapper for executing the functions of code element 411 that cannot be executed using wrapper 410. Generation engine 110 (as shown in FIG. 1) may select a wrapper from existing wrappers (e.g., wrappers 122 of FIG. 1) and transition to the selected wrapper. In some embodiments, generation engine 110 may transition between wrappers by generating a new wrapper or transforming an existing wrapper. A detailed description of the transformation of wrappers is provided in FIGS. 5A-B description below.

As illustrated in FIG. 4A, generation engine 110 may transition code element 411 into a new wrapper 420 while using wrapper 410 to wrap code element 411. Code execution management system 100 may maintain code element 411 wrapped in wrapper 410 for a period.

As illustrated in FIG. 4B, wrapper 420 may completely replace wrapper 410 upon identifying a function that cannot be handled by wrapper 410. Wrapper 420 may include abilities of wrapper 410 and additional abilities missing in wrapper 410 to execute functions of code element 411.

Generation engine 110 may determine all the wrappers (e.g., wrapper 410 and 420) before executing code element 411 wrapped using the generated wrapper. In some embodiments, wrappers may be generated and/or transitioned just in time when a function of code element needs an ability missing in the currently wrapping wrapper. Code execution management system may choose between transitions illustrated in FIGS. 4A-B based on historical behavior of software application including code element 411. In some embodiments, may manage transitions based on behaviors of code elements similar to code element 411. Code execution management system 100 may maintain wrappers 410 and 420 for set periods based on historical behavior of code element 411 and similar code elements.

Figure 5B:
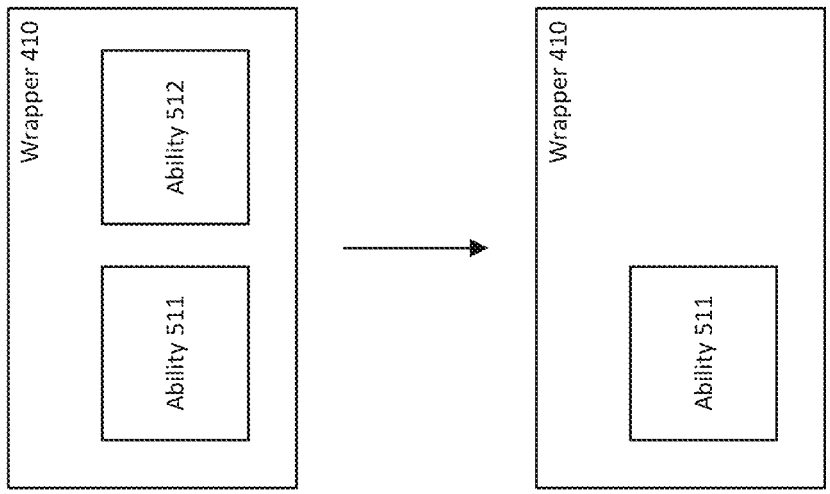
FIGS. 5A-B show transformations of wrappers, according to embodiments of present disclosure.
Figure 5A:
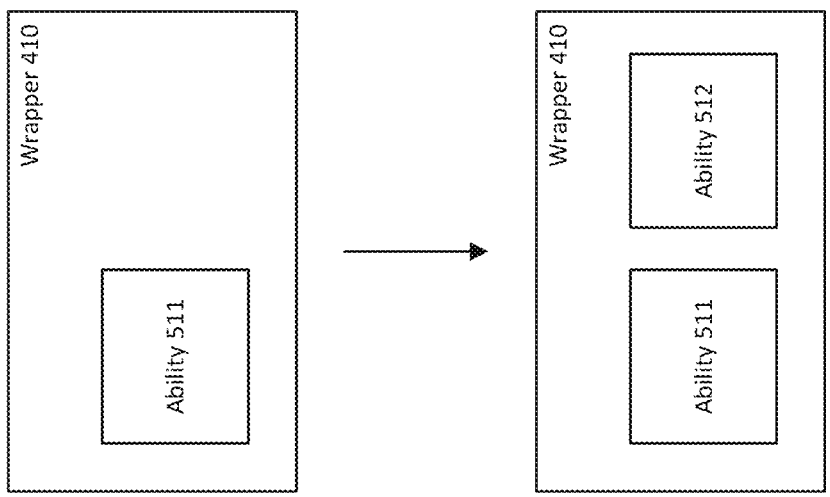

FIGS. 5A-B show transformations of a wrapper, according to embodiments of present disclosure. Code execution management system 100 may transform wrapper 410 by updating its abilities. Transform module 210 (as shown in FIG. 2) may be used to update wrapper 410's abilities. As illustrated in FIG. 5A, wrapper 410 may be modified to include additional ability 512. Transform module 210 may transform wrapper to include abilities based on operating system functionalities requested by code element (e.g., code element 411 of FIG. 4A) wrapped using a wrapper (e.g., wrapper 410). Abilities 511-512 may include function calls to operating system functionality exposed using modules (e.g., modules 124 of FIG. 1) or bundles (e.g., bundles 125 of FIG. 1) of modules. In some embodiments, abilities 511-512 may include API calls to microservices exposing operating system functionality over a network. A detailed description of different pathways to access operating system functionality through wrappers is provided in FIG. 6 description below.

As illustrated in FIG. 5B, wrapper 410 may be transformed by dropping ability 512 to generate wrapper 410 with available ability 511. Code execution management system 100 may employ transform module 210 to drop ability upon completion of access to an operating system functionality requested by code element (e.g., code element 411 of FIG. 4A). Code execution management system 100 may transform wrapper 410 to drop ability 412 based on the confidence score associated with accessing operating system functionality. In some embodiments, code execution management system 100 may wait a set period before requesting the transformation of a wrapper (e.g., wrapper 410). Code execution management system 100 may transform wrapper to avoid potential security threats that may be possible by including an unused ability (e.g., ability 512). For example, code element 411 wrapped using wrapper 410 may include malicious code to access ability 512 after code element 411 has completed its use to access an operating system functionality.

Figure 6:
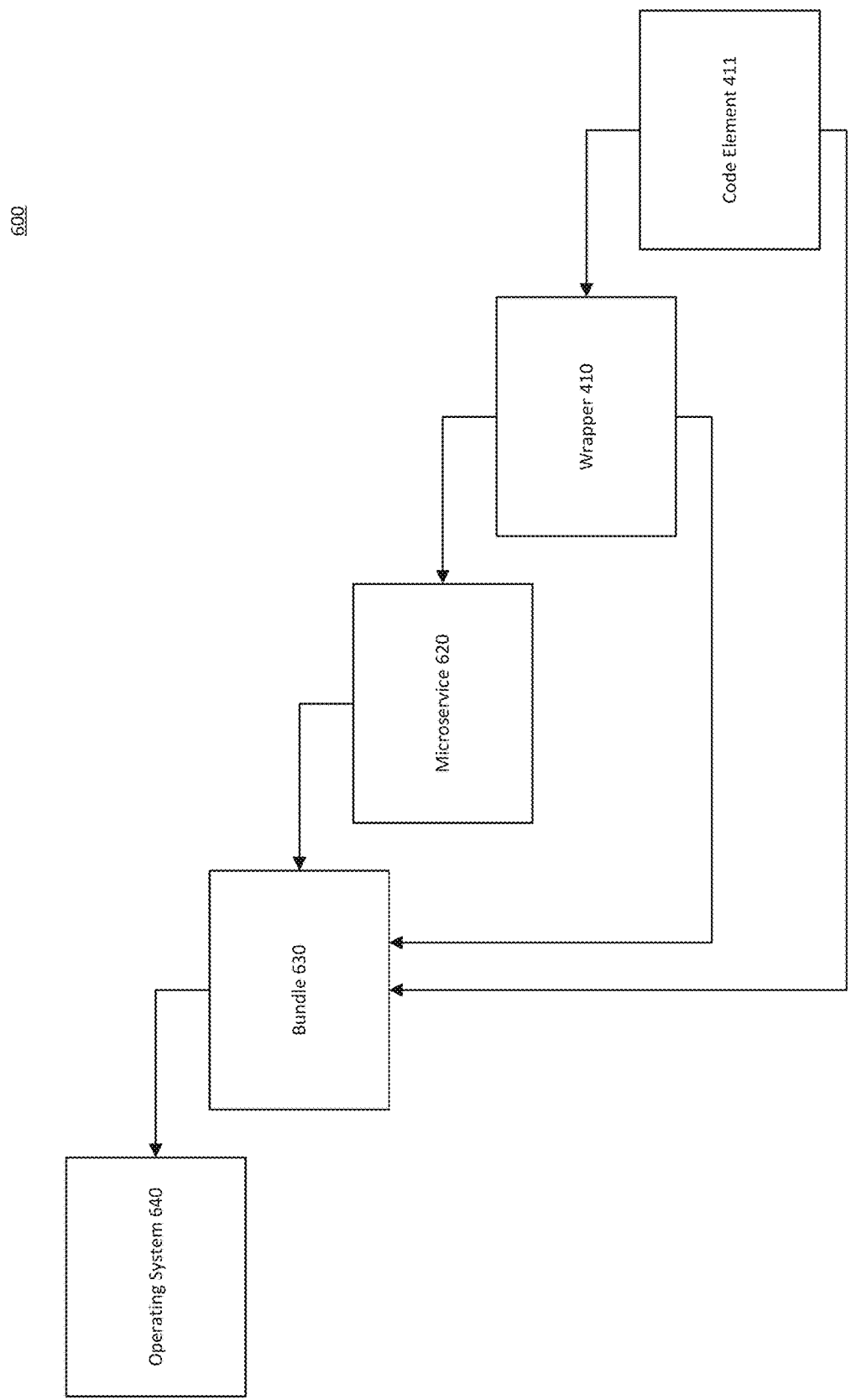
FIG. 6 shows a flow diagram of interactions between code elements and different layers of execution environments, according to some embodiments of the present disclosure.

FIG. 6 shows a flow diagram of interaction between code elements and different layers of execution environment 600, according to some embodiments of the present disclosure. As illustrated in FIG. 6, code element 411 may interact with operating system 640's functionality in various manners through wrapper 410 or bundle 630. In some embodiments, code element 411 accessing operating system 640's functionality may also need to use other intermediary layers such as microservice 620 to access operating system 640's functionality. Code element 411's path to access various operating system functionality may depend on an execution environment (e.g., execution environment 600).

An application including various code elements (e.g., code elements 121 of FIG. 1) may utilize multiple execution environments to access operating system functionality. Code execution management system 100 (as shown in FIG. 1) may replace the execution environment with a new execution environment based on the currently executing code element (e.g., code element 411). Code execution management system 100 may use orchestrator 111 (as shown in FIG. 1) to manage interaction paths between code element 411 and operating system 640. Orchestrator 111 may manage interaction paths by selecting different execution environments to execute various code element functions (e.g., code element 411). In some embodiments, selecting an execution environment may include updating the execution environment by modifying or replacing wrapper 410, microservice 620, or bundle 630 used to access operating system functionality. A detailed description of how code execution management system 100 may modify and generate a new version of bundle 630 is provided in FIG. 8's description below. In some embodiments, code execution management system 100 may simultaneously maintain multiple execution environments to execute functions of code element 411.

Wrapper 410 surrounding code element 411 may access bundle 630, exposing operating system 640 functionality through microservice 620. Code element 411 may access microservice 620 over a network (not shown in FIG. 6). Network may take various forms. For example, network may include or utilize the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, or other types of network communications. In some embodiments, network may include an on-premises (e.g., LAN) network, while in other embodiments, network may include a virtualized (e.g., AWS™ Azure™, IBM Cloud™, etc.) network. Further, network may in some embodiments be a hybrid on-premises and virtualized network, including components of both types of network architecture.

As illustrated in FIG. 6, code element 411 may utilize wrapper 410 to access operating system 640's functionality exposed using bundle 630, including various modules (e.g., modules 124 of FIG. 1). Code execution management system 100 managing execution environments for code element 411 may modify wrapper 410 to access modules that may be part of bundle 630, exposing operating system 640's functionality accessed by applications, including code element 411. In some execution environments, code element 411 may directly access operating system functionality through bundle 630 without the use of intermediaries such as wrapper 410 and microservice 620. In some embodiments, execution environment 600 may provide different pathways to access operating system functionality without switching or transforming execution environments. Code execution management system 100 may select different pathways based on security policies (e.g., security policies 123 of FIG. 1) associated with the code element (e.g., code element 411)

Figure 7:
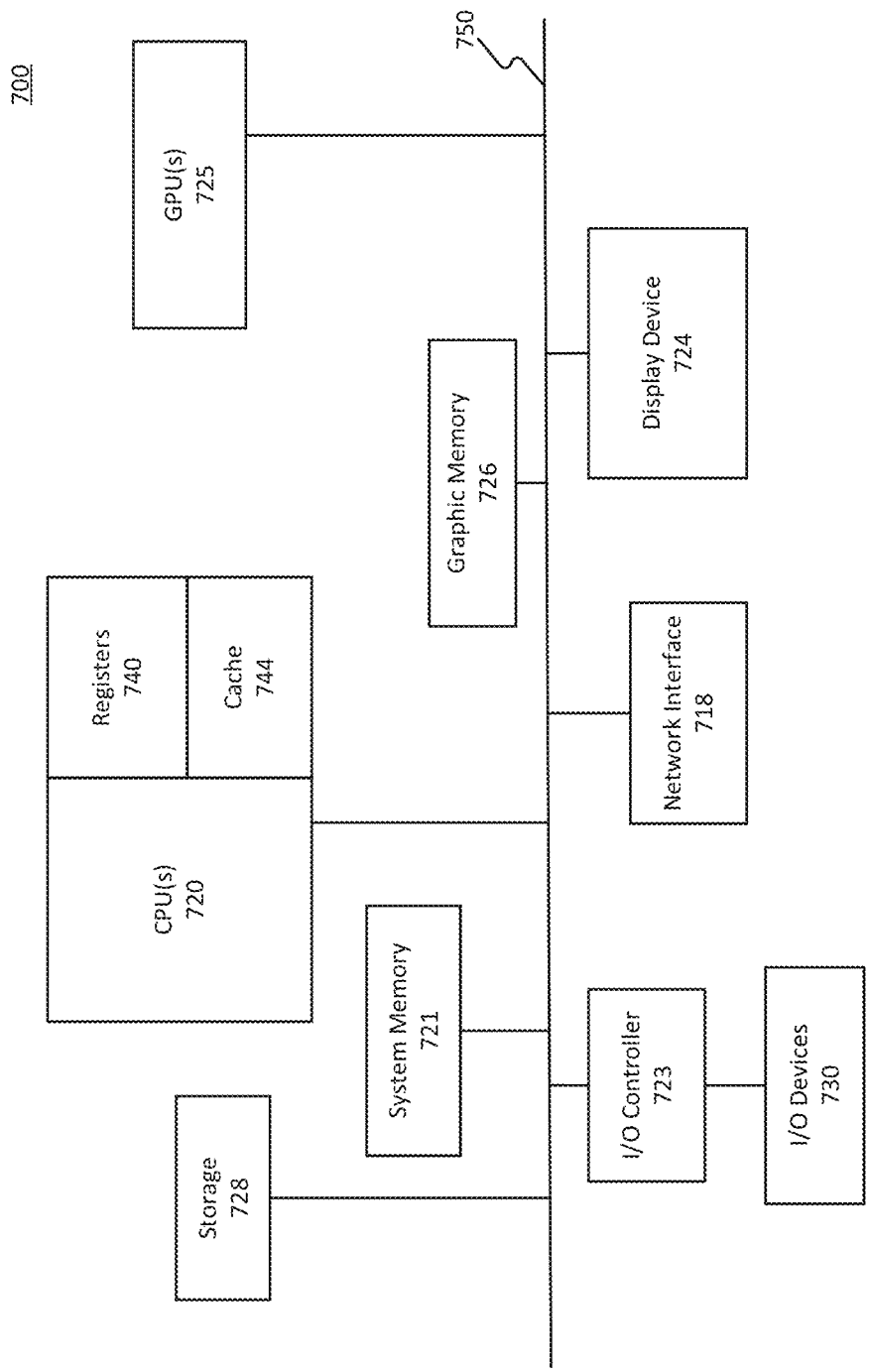
FIG. 7 is a block diagram of an exemplary computing device used to implement a code execution management system of FIG. 1, according to some embodiments of the present disclosure.

FIG. 7 is a block diagram of an exemplary computing device 700, consistent with embodiments of the present disclosure. In some embodiments, computing device 700 may be a specialized server or other computing resource providing the functionality described herein. In some embodiments, components of code execution management system 100, such as generation engine 110, repository 120 of FIG. 1, may be implemented using the computing device 700 or multiple computing devices 700 operating in parallel. Further, the computing device 700 may be a second device providing the functionality described herein or receiving information from a server to provide at least some of the described functionality. Moreover, the computing device 700 may be an additional device or devices that store or provide data consistent with embodiments of the present disclosure and, in some embodiments, computing device 700 may be a virtualized computing device such as a virtual machine, multiple virtual machines, or a hypervisor.

Computing device 700 may include one or more central processing units (CPUs) 720 and a system memory 721. Computing device 700 may also include one or more graphics processing units (GPUs) 725 and graphic memory 726. In some embodiments, computing device 700 may be a headless computing device that does not include GPU(s) 725 or graphic memory 726.

CPUs 720 may be single or multiple microprocessors, field-programmable gate arrays, or digital signal processors capable of executing sets of instructions stored in a memory (e.g., system memory 721), a cache (e.g., cache 741), or a register (e.g., one of registers 740). CPUs 720 may contain one or more registers (e.g., registers 740) for storing various types of data including, inter alia, data, instructions, floating-point values, conditional values, memory addresses for locations in memory (e.g., system memory 721 or graphic memory 726), pointers and counters. CPU registers 740 may include special-purpose registers used to store data associated with executing instructions such as an instruction pointer, an instruction counter, or a memory stack pointer. System memory 721 may include a tangible or a non-transitory computer-readable medium, such as a flexible disk, a hard disk, a compact disk read-only memory (CD-ROM), magneto-optical (MO) drive, digital versatile disk random-access memory (DVD-RAM), a solid-state disk (SSD), a flash drive or flash memory, processor cache, memory register, or a semiconductor memory. System memory 721 may be one or more memory chips capable of storing data and allowing direct access by CPUs 720. System memory 721 may be any type of random-access memory (RAM), or other available memory chip capable of operating as described herein.

CPUs 720 may communicate with system memory 721 via a system interface 750, sometimes referred to as a bus. In embodiments that include GPUs 725, GPUs 725 may be any type of specialized circuitry that may manipulate and alter memory (e.g., graphic memory 726) to provide or accelerate the creation of images. GPUs 725 may have a highly parallel structure optimized for processing large, parallel blocks of graphical data more efficiently than general-purpose CPUs 720. Furthermore, the functionality of GPUs 725 may be included in a chipset of a special purpose processing unit or a co-processor.

CPUs 720 may execute programming instructions stored in system memory 721 or other memory, operate on data stored in memory (e.g., system memory 721), and communicate with GPUs 725 through the system interface 750, which bridges communication between the various components of the computing device 700. In some embodiments, CPUs 720, GPUs 725, system interface 750, or any combination thereof, are integrated into a single chipset or processing unit. GPUs 725 may execute sets of instructions stored in memory (e.g., system memory 721), to manipulate graphical data stored in system memory 721 or graphic memory 726. For example, CPUs 720 may provide instructions to GPUs 725, and GPUs 725 may process the instructions to render graphics data stored in the graphic memory 726. Graphic memory 726 may be any memory space accessible by GPUs 725, including local memory, system memory, on-chip memories, and hard disk. GPUs 725 may enable displaying of graphical data stored in graphic memory 726 on display device 724 or may process graphical information and provide that information to connected devices through network interface 718 or I/O devices 730.

Computing device 700 may include a display device 724 and input/output (I/O) devices 730 (e.g., a keyboard, a mouse, or a pointing device) connected to I/O controller 723. I/O controller 723 may communicate with the other components of computing device 700 via system interface 750. It should now be appreciated that CPUs 720 may also communicate with system memory 721 and other devices in manners other than through system interface 750, such as through serial communication or direct point-to-point communication. Similarly, GPUs 725 may communicate with graphic memory 726 and other devices in ways other than system interface 750. In addition to receiving input, CPUs 720 may provide output via I/O devices 730 (e.g., through a printer, speakers, bone conduction, or other output devices).

Furthermore, the computing device 700 may include a network interface 718 to interface to a LAN, WAN, MAN, or the Internet through a variety of connections including, but not limited to, standard telephone lines, LAN or WAN links (e.g., 802.21, T1, T3, 56 kb, X.25), broadband connections (e.g., ISDN, Frame Relay, ATM), wireless connections (e.g., those conforming to, among others, the 802.11a, 802.11b, 802.11b/g/n, 802.11ac, Bluetooth, Bluetooth LTE, 3GPP, or WiMax standards), or some combination of any or all of the above. Network interface 718 may comprise a built-in network adapter, network interface card, PCMCIA network card, card bus network adapter, wireless network adapter, USB network adapter, modem, or any other device suitable for interfacing the computing device 700 to any type of network capable of communication and performing the operations described herein.

Figure 8:
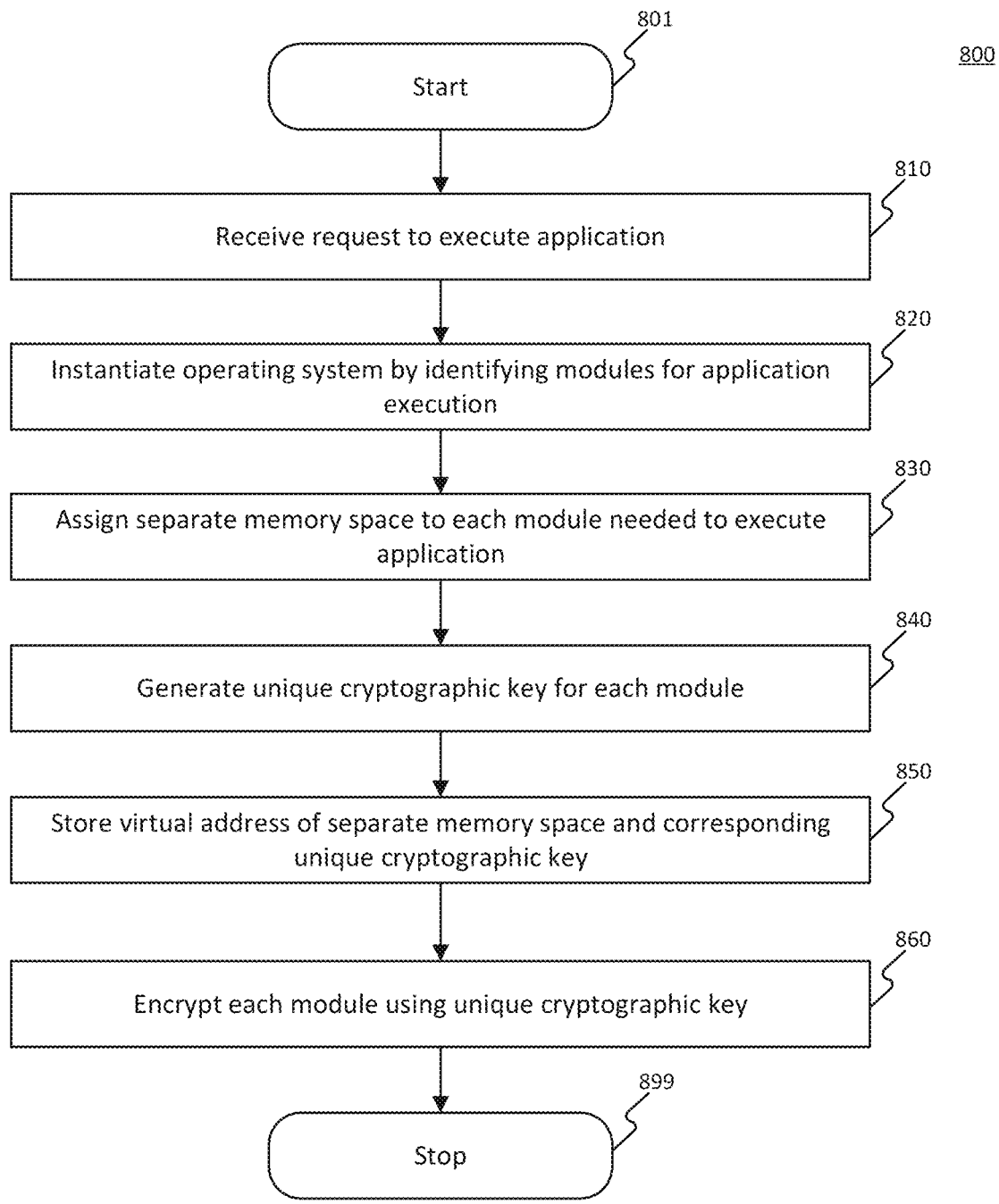
FIG. 8 is a flowchart depicting operations of an exemplary method for dynamic management of modules of operating systems for execution of code, according to some embodiments of present disclosure.

FIG. 8 is a flowchart depicting operations of an exemplary method for dynamic management of modules of operating system (e.g., operating system 640 of FIG. 6) for execution of software code, according to some embodiments of present disclosure. The steps of method 800 may be performed by code execution management system 100 for purposes of illustration. It will be appreciated that the illustrated method 800 may be altered to modify the order of steps and to include additional steps.

In step 810, code execution management system 100 may receive a request to execute an application. Application may include one or more code elements (e.g., code elements 121 of FIG. 1). In some embodiments, code execution management system 100 may automatically receive a request to execute an application based on trigger events. In some embodiments, a trigger event may include a request to store updates to the application as part of application execution. In some embodiments, code execution management system 100 may receive a request for application execution from user devices 310.

In step 820, code execution management system 100 may instantiate an operating system (e.g., operating system 640 of FIG. 6) by identifying modules (e.g., modules 124 of FIG. 1) for executing application. Application may include one or more code elements (e.g., code elements 121 of FIG. 1). Code execution management system 100 may identify each code element (e.g., code element 330 of FIG. 3) of application requested for execution in step 810. In some embodiments, code element 330 may include changes to application that triggered a request for execution. Code execution management system 100 may identify bundle (e.g., bundle 630 of FIG. 6) including one or more modules (e.g., modules 124 of FIG. 1) to execute application. Code execution management system 100 may instantiate a separate operating system per application.

In step 830, code execution management system 100 may assign separate memory space to each module needed to execute application. Code execution management system 100 may request instantiated operating system to assign separate memory space to each module needed to execute application. Code execution management system 100 may use memory mapper 252 (as shown in FIG. 2B) to manage memory spaces assigned to modules associated with operating system (e.g., operating system 640 of FIG. 6). In some embodiments, operating system may employ some modules such as core kernel modules to manage memory space assignment for modules exposing functionality needed by application requested for execution. Core kernel modules may manage available memory as pages and swap pages for execution of modules. In some embodiments, code execution management system 100 may assign separate memory for each module instance in different groups of modules associated with different operating system instances.

Code execution management system 100 may run each module in a separate memory space and as a separate process. Code execution management system 100 may delegate the memory space management to memory mapper 252 for managing running modules as needed for application execution. In some embodiments, core kernel modules may manage memory space as pages and swap pages based on different modules running as required by executing application.

Code execution management system 100 may identify various groups of modules identified as part of operating system instantiation in step 820. Groups of modules may execute in different spaces with different privileges and permissions. In some embodiments, some modules may manage other modules or module groups. For example, code execution management system 100 may identify modules that may form the core kernel as the base layer of modules to manage other modules such as service modules.

In step 840, code execution management system 100 may generate unique cryptographic key for each module associated with operating system. Code execution management system 100 may use key generator 253 (as shown in FIG. 2B) to generate cryptographic keys. In some embodiments, code execution management system 100 may request core kernel modules of instantiated operating system to generate unique cryptographic keys.

In step 850, code execution management system 100 may store virtual addresses and corresponding unique cryptographic keys. Code execution management system 100 may use memory mapper 252 (as shown in FIG. 2) to manage virtual addresses of memory spaces storing and running modules and cryptographic keys needed to decrypt memory space.

Code execution management system 100 may run each module as a separate process with its own memory space as a set of pages in memory. Code execution management system 100 may manage the set of memory pages, forming a separate memory space by assigning a virtual address. In some embodiments, code execution management system 100 may delegate assignment of virtual address to core kernel modules of instantiated operating system.

Processes executing service modules may communicate with processes executing core kernel modules via shared memory message query. Processes executing different service modules may communicate with each other using a shared memory message queue. Processes executing user applications may communicate with service modules using a specific API message queue dedicated for the application.

In step 860, code execution management system 100 may encrypt each memory space identified by virtual address from step 850 using a unique cryptographic key from step 840. Code execution management system 100 may encrypt memory space used by a module process. Code execution management system 100 may use wrapper engine 112 to help encrypt modules using a cryptographic key managed by key generator 253. Wrapper engine 112 may access the memory location with the module and use the associated cryptographic key to encrypt the module. Code execution management system 100 may encrypt memory spaces to prevent processes from accessing other processes' memory spaces. In some embodiments, code execution management system 100 may encrypt memory spaces to help restrict memory spaces of each module process from being accessed by an unauthorized application. Code execution management system 100 may use the encrypted memory spaces to securely access functionality needed by executing application. Code execution management system 100, upon completion of step 860, completes (step 899) executing method 800.

Figure 9:
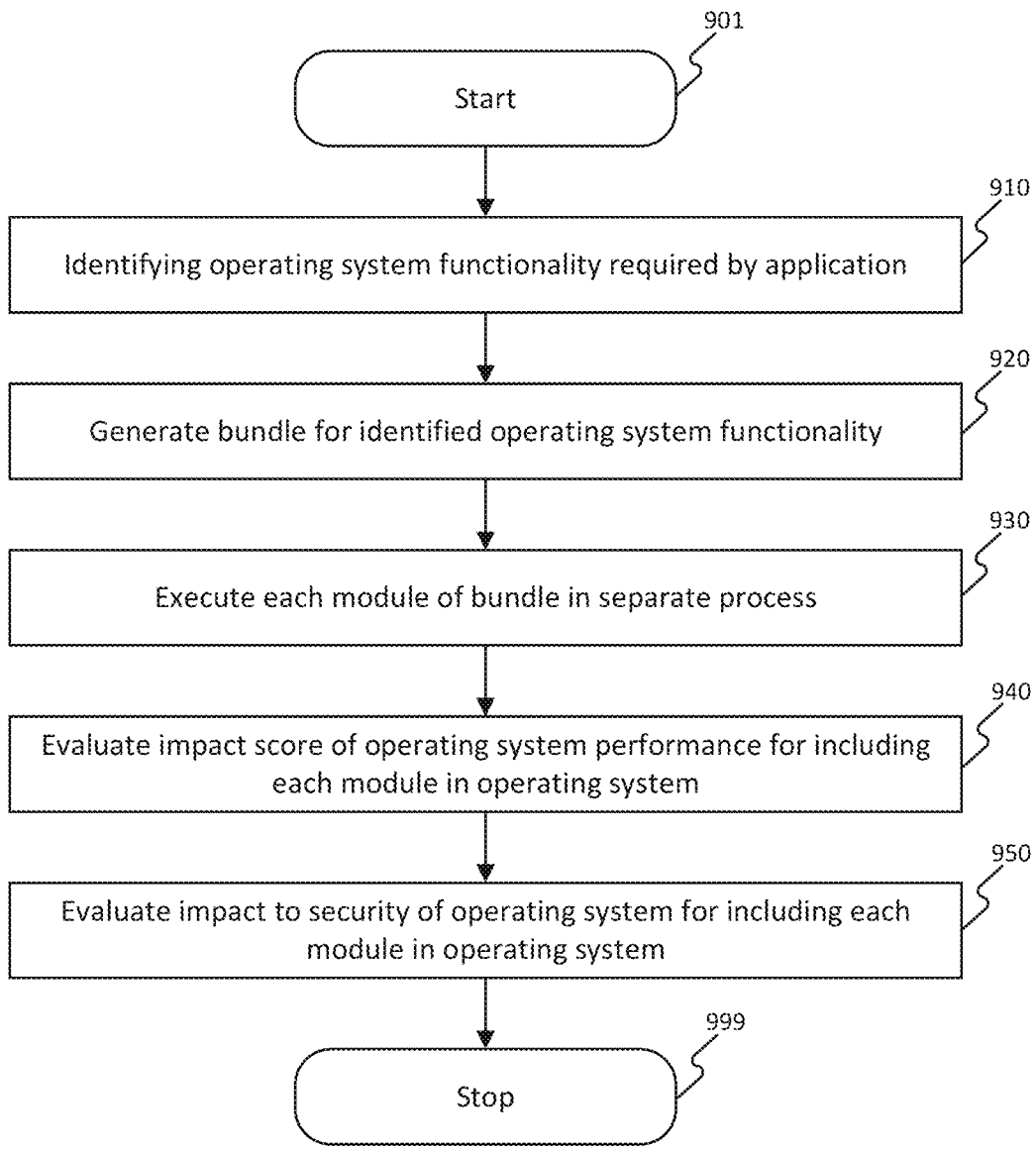
FIG. 9 is a flowchart depicting operations of an exemplary method for analyzing modules of operating systems for execution of code, according to some embodiments of present disclosure.

FIG. 9 is a flowchart depicting operations of an exemplary method for analyzing modules of an operating system for execution of applications, according to some embodiments of present disclosure. The steps of method 900 may be performed by code execution management system 100 for purposes of illustration. It will be appreciated that the illustrated method 900 may be altered to modify the order of steps and to include additional steps.

In step 910, code execution management system 100 may identify operating system functionality required by an application, including one or more code elements (e.g., code elements 121 of FIG. 1). Code execution management system 100 may review various code elements to determine operating system functionality required by the application. Module listing 251 (as shown in FIG. 2B) of code execution management system 100 may review functionality needed by application to determine a list of modules required by application.

In step 920, code execution management system 100 may generate bundle for identified operating system functionality. Code execution management system 100 may generate a bundle for identified operating system functionality by identifying modules (e.g., modules 124 of FIG. 1) that may be required by code elements of application. Code execution management system 100, upon identifying the required modules, may generate bundle. Code execution management system 100 may select modules based on their dependencies to generate a bundle. Code execution management system 100 may store bundle in bundles 125 (as shown in FIG. 1). Code execution management system 100 may generate a bundle of modules just in time when the application code elements requiring a certain functionality are executing. Code execution management system 100 may disband bundle after the completion of the execution of a code element of application that requested operating system functionality addressed by the generated bundle of modules.

In some embodiments, code execution management system 100 may select a bundle from bundles 125 that already include modules that provide the operating system functionality identified in step 910. In some embodiments, code execution management system 100 may edit the modules in an existing bundle of bundles 125 and store them in repository 120 as a new bundle. Code execution management system 100 may maintain different versions of bundle based on the different versions of application. Code execution management system 100 may select the appropriate version of bundle from bundles 125 based on the version of application. In some embodiments, code execution management system 100 may maintain a mapping between generated bundles and applications, including different versions of the same application.

In step 930, code execution management system 100 may execute each module in a separate process. Code execution management system 100 may execute modules in generated bundle of step 920 to expose operating system functionality and process requests from executing application.

In step 940, code execution management system 100 may evaluate impact score of operating system performance for including each module in operating system. Code execution management system 100 may use impact module 114 (as shown in FIG. 1) to determine impact to operating system performance when utilizing each module of generated bundle in step 920. Code execution management system 100 may use performance impact score to calculate confidence score of module. Code execution management system 100 may manage confidence scores of modules for different applications separately. In some embodiments, only cumulative confidence of module used across various operating systems executing different applications and their code elements.

In step 950, code execution management system 100 may evaluate impact on security of operating system for including each module in operating system. Code execution management system 100 may use threat security engine 115 (as shown in FIG. 1) to determine impact on security of operating system. In some embodiments, threat security engine 115 may also determine impact on the security of additional instances of operating systems (e.g., operating systems 126 of FIG. 1). Threat security engine 115 may evaluate security impact of a module by determining the probability of module accessing memory space beyond the assigned memory space. In some embodiments, threat security engine 115 may determine access to memory space beyond assigned limits by evaluating probability of communicating with other modules in the operating system and other operating systems. Code execution management system 100 may calculate confidence scores (e.g., confidence scores 127 of FIG. 1) of the module based on the security impact on operating system. Code execution management system 100, upon completion of step 950, completes (step 999) executing method 900.

Figure 10:
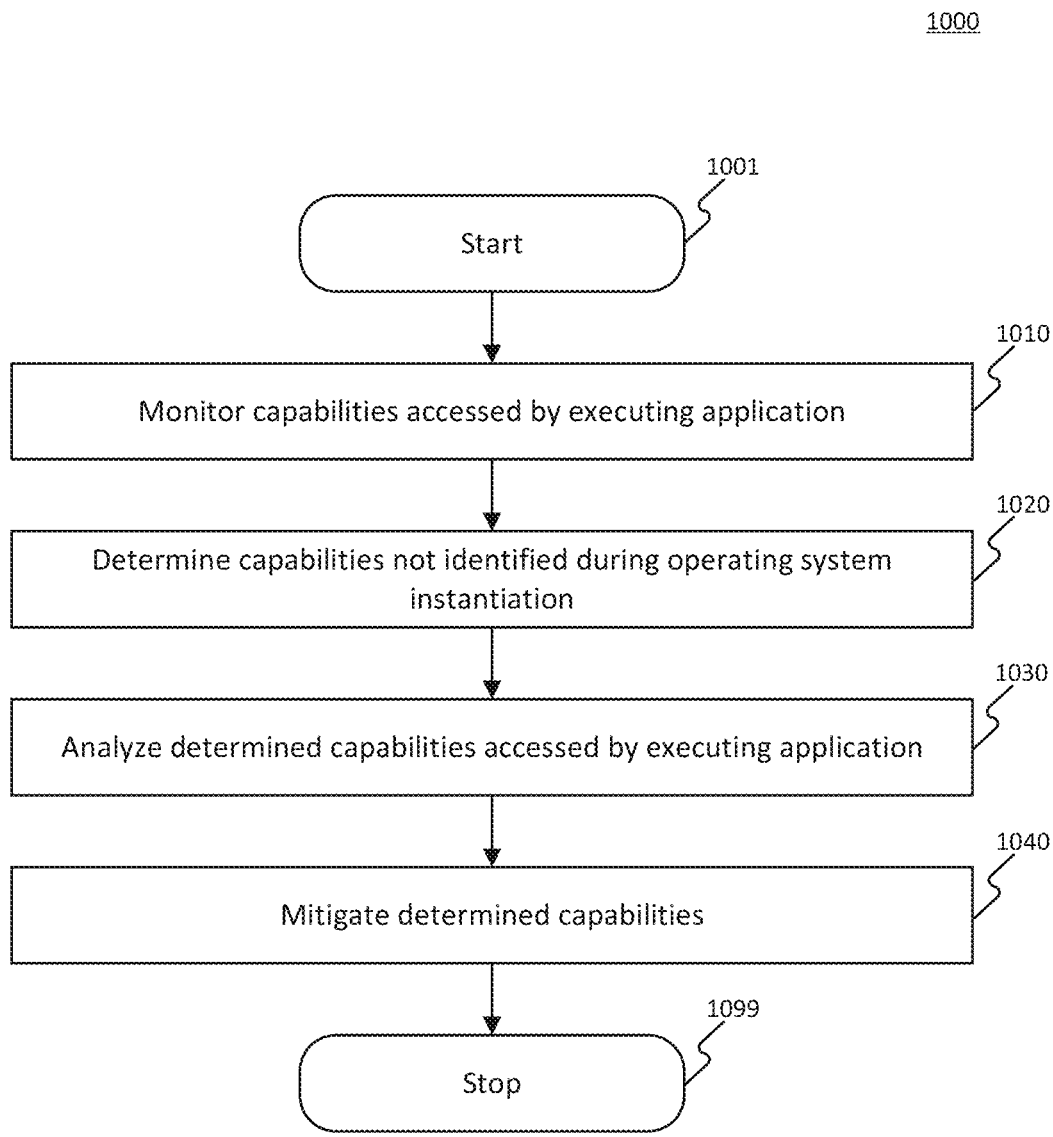
FIG. 10 is a flow chart depicting operations of an exemplary method for management of application execution using an operating system of FIG. 8, according to some embodiments of present disclosure.

FIG. 10 is a flow chart depicting operations of an exemplary method for management of application execution using an operating system generated using a process described in FIG. 8, according to some embodiments of present disclosure. The steps of method 1000 may be performed by code execution management system 100 for purposes of illustration. It will be appreciated that the illustrated method 1000 may be altered to modify the order of steps and to include additional steps.

In step 1010, code execution management system 100 may monitor capabilities accessed by executing application. Code execution management system 100 may monitor capabilities by observing access to different abilities (e.g., abilities 511-512 of FIG. 5A) of wrapper surrounding code elements forming application. Code execution management system 100 may employ monitory module 220 to monitor capabilities accessed by application. Accessed capabilities may include functionality of operating system exposed using modules (e.g., modules 124 of FIG. 1) included with operating system.

In step 1020, code execution management system 100 may determine capabilities not identified during operating system instantiation. Code execution management system 100 may determine new capabilities by comparing operating system modules (e.g., modules 124) accessed by execution application to the list of modules included during operating system instantiation in method 800 of FIG. 8.

In step 1030, code execution management system 100 may analyze determined capabilities accessed by executing application. Code execution management system 100 may analyze capabilities by evaluating different modules utilized to expose each capability. Code execution management system 100 evaluation may include impact to performance and security of execution environment including under operating system and hardware. Code execution management system 100 may analyze capabilities to identify what adjustments need to be made to the wrapper (e.g., wrapper 410 of FIG. 4A) surrounding code element (e.g., code element 411 of FIG. 4A).

In step 1040, code execution management system 100 may mitigate capabilities by limiting what access is allowed and performed by executing application. Code execution management system 100 may mitigate by adjusting abilities of wrapper (e.g., wrapper 410 of FIG. 4A) surrounding a code element of the executing application. For example, ability 512 (as shown in FIG. 5B) may be removed from wrapper 410. Code execution management system 100, upon completion of step 1040, completes (step 1099) executing method 1000.

Figure 11:
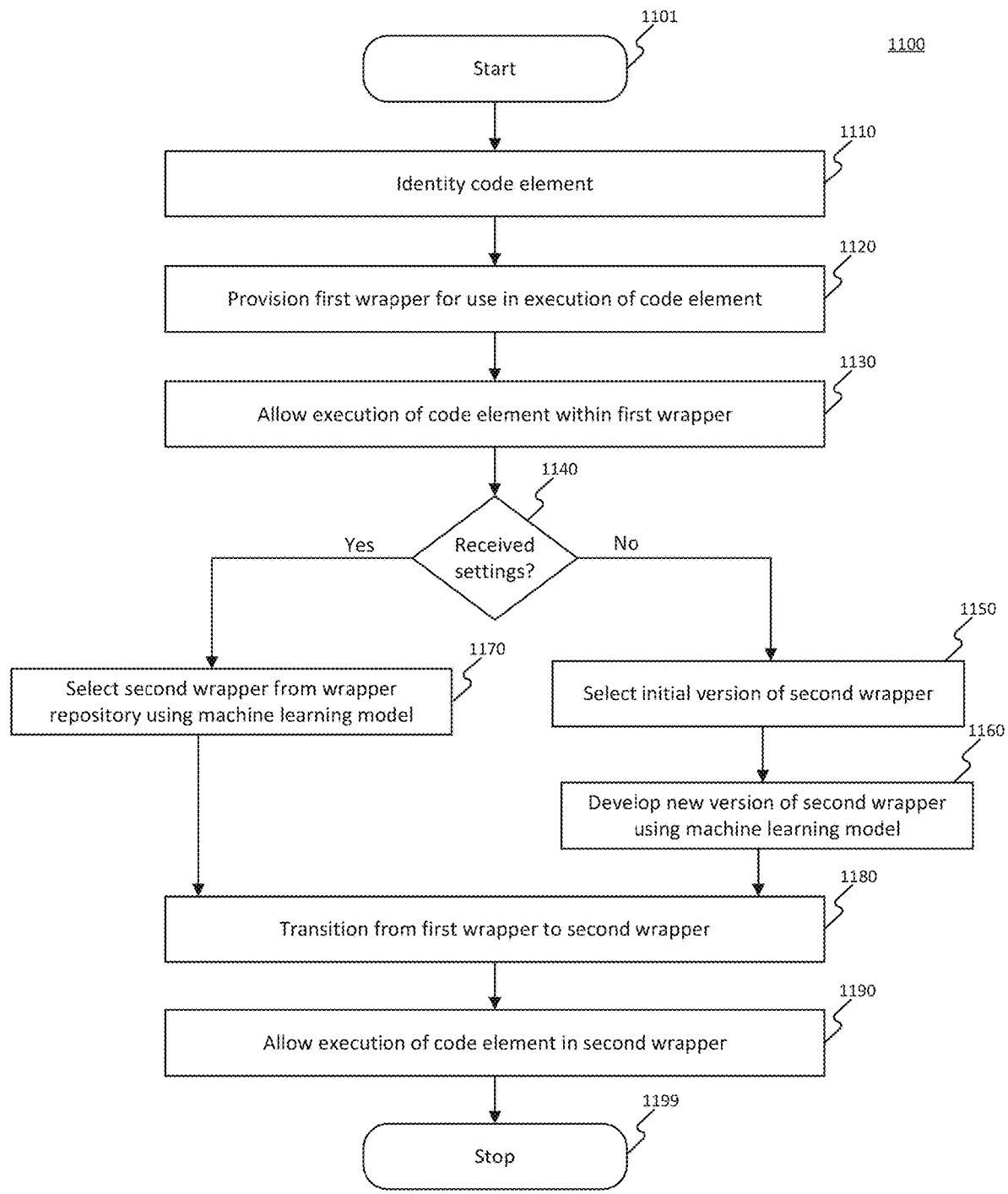
FIG. 11 is a flowchart depicting operations of an exemplary method for dynamic configuration and deployment of customizable and secure wrappers, according to some embodiments of the present disclosure.

FIG. 11 is a flowchart depicting operations of an exemplary method for dynamic configuration and deployment of customizable secure wrappers, according to some embodiments of the present disclosure. The steps of method 1100 may be performed by code execution management system 100 for purposes of illustration. It will be appreciated that the illustrated method 1100 may be altered to modify the order of steps and to include additional steps.

In step 1110, code execution management system 100 may identify code element by receiving code element as described in FIG. 3 description above. In some embodiments, code execution management system 100 may receive code element from user (e.g., user 320 of FIG. 3) of user device (e.g., user devices 310 of FIG. 3). In some embodiments, code execution management system 100 may identify code element based on the updates received to a software executed by code execution management system 100. In some embodiments, code execution management system 100 may identify code element from an execution request with reference to code element. Code element reference may point to a code element in code elements 121 (as shown in FIG. 1).

In step 1120, code execution management system 100 may provision first wrapper for use in execution of code element by retrieving wrapper of wrappers 122 (as shown in FIG. 1). In some embodiments, generation engine 110 of code execution management system 100 may provision first wrapper by generating first wrapper. First wrapper may be a default wrapper always selected when beginning execution of code element. Each code element may have a different default wrapper. Default wrapper for a code element or a software application including the identified code element has bare minimum access to functionality needed by code element. In some embodiments, code execution management system 100 may review the requirements of code element before selecting a wrapper from wrappers 122 for provisioning wrapper.

In step 1130, code execution management system 100 may allow execution of code element within first wrapper. Code execution management system 100 may allow execution of code element by allowing the execution of specific functions of code element. In some embodiments, allowancing execution of code element may include determining if a function call may need to be limited or fully restricted. For example, a function of code element wanting to communicate over a port may be limited by provisioned wrapper to a certain protocol and/or network speed. In another scenario, any network communication outside of a LAN network of devices may be completely restricted from communication. First wrapper may allow execution of functions of code element by including and dropping abilities from first wrapper. A detailed description of transforming wrapper by updating its abilities is provided in FIGS. 5A-B descriptions above.

In step 1140, code execution management system 100 may determine if configuration settings were sent by a user of code execution management system 100. If the answer to question in step 1140 is yes, i.e., configuration settings were included, then method 1100 may jump to step 1170.

If the answer to the question in step 1140 is no, i.e., configuration settings were not included in the request to execute code element, then continue to step 1150. In step 1150, code execution management system 100 may select initial version of second wrapper from wrappers 122. In some embodiments, initial version of second wrapper may be a default wrapper accessed by generation engine 110.

In step 1160, code execution management system 100 may develop new version of second wrapper using generation engine 110. Transform module 210 in generation engine 110 may automatically develop a new version of the second wrapper using machine learning model. Machine learning model may be trained using wrappers with abilities generated in the past for various functionality needs of code elements (e.g., code elements 121 of FIG. 1). Upon completion of step 1160, method 1100 may jump to step 1180.

In step 1170, code execution management system 100 may select second wrapper from wrapper repository using machine learning model. Machine learning model may help select second wrapper based on wrappers selected for similar code elements.

In step 1180, code execution management system 100 may transition from first wrapper to second wrapper by either replacing the existing wrapper or wrapping a copy of the code element current wrapped using first version with second wrapper. Code execution management system 100 may transition copy of code element wrapped by second element when the ability needed to execute a function in a code element is called by the software application. Code execution management system 100 may transition between wrappers seamlessly without a break in the execution of code elements.

In step 1190, code execution management system 100 may allow execution of functions of code element in second wrapper which needed abilities only present in second wrapper. Code execution management system 100 may continue to develop second wrapper by further updating abilities as may be needed by other functions of code element. Code execution management system 100, upon completion of step 1190, completes (step 1199) executing method 1100.

Figure 12:
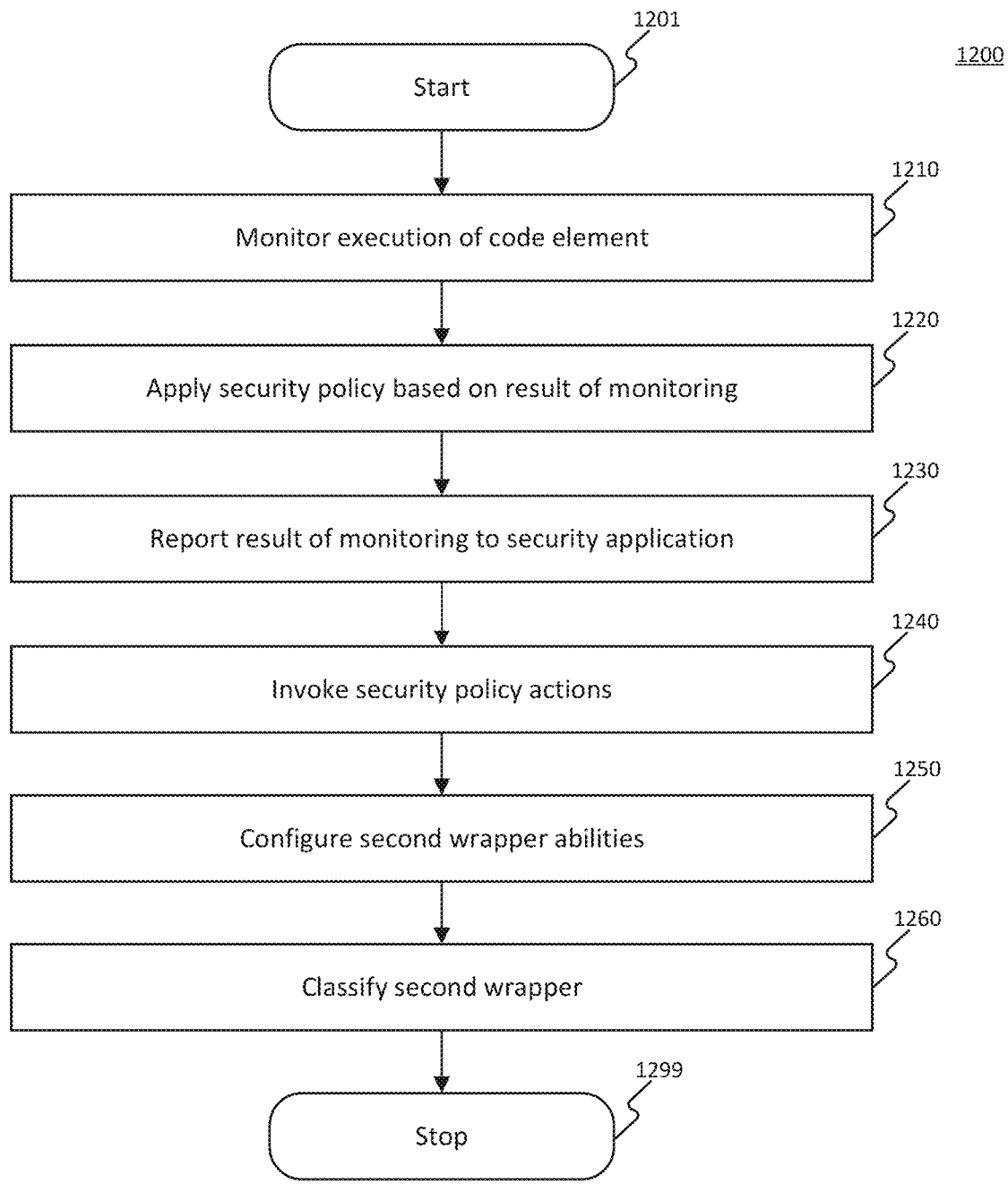
FIG. 12 is a flowchart depicting operations of an exemplary method for generating wrappers, according to some embodiments of the present disclosure.

FIG. 12 is a flowchart depicting operations of an exemplary method 1200 for generation of a wrapper, according to some embodiments of the present disclosure. The steps of method 1200 may be performed by code execution management system 100 for purposes of illustration. It will be appreciated that the illustrated method 1200 may be altered to modify the order of steps and to include additional steps.

In step 1210, code execution management system 100 may monitor execution of a code element. Monitor module 220 (as shown in FIG. 2A) may help monitor execution of code element. Code execution management system 100 may observe functionality requested by code element, accessed data, and communication protocols employed in communication to determine In step 1220, code execution management system 100 may apply security policy based on result of monitoring step 1210 to wrapper providing execution environment to code element. Code execution management system 100 may select security policy from security policies 123 to apply to wrapper. In some embodiments, security policy may be provided by a user of a user device (e.g., user devices 310 of FIG. 3). Code execution management system 100 may select a security policy based on the abilities of wrapper associated with the execution of code element. In some embodiments, multiple security policies may be applied to wrapper. Code execution management system 100 may select security policy based on types of activities attempted by functions in code element.

In step 1230, code execution management system 100 may report a monitoring result to a security application (e.g., threat security engine 115 of FIG. 1). Reporting module 140 may help report results of a monitoring wrapper conducted by monitor module 130. A security application may register a wrapper and security policies to observe when a code element is executed using a wrapper.

In step 1240, code execution management system 100 may invoke security policy actions as identified in the security policy applied to a wrapper by monitor module 220. Invocation of security policy actions may help determine the type of abilities to allow, as discussed above.

In step 1250, code execution management system 100 may configure wrapper abilities based on the abilities identified to meet a security policy. Code execution management system 100 may add or drop abilities included in a wrapper (e.g., wrapper 410 of FIG. 4A) as shown in FIGS. 5A-B.

In step 1260, code execution management system 100 may classify another wrapper as trusted or untrusted based on the code element containing trusted or untrusted code and/or security policies applied to the wrapper. Classifier 240 may help classify a wrapper based on security policies applied to the wrapper. Classifier 240 may classify a wrapper as untrusted if the number of security policies applied to a wrapper restricting its abilities is greater than a threshold value. In some embodiments, the type of security policies applied may have different weights, and the total weight of the security policy limitations is used to classify a wrapper as untrusted. The weight of an action depends on the impact it has on the performance or security of the executing environment. Code execution management system 100, upon completion of step 1260, completes (step 1299), executing method 1200.

Figure 13:
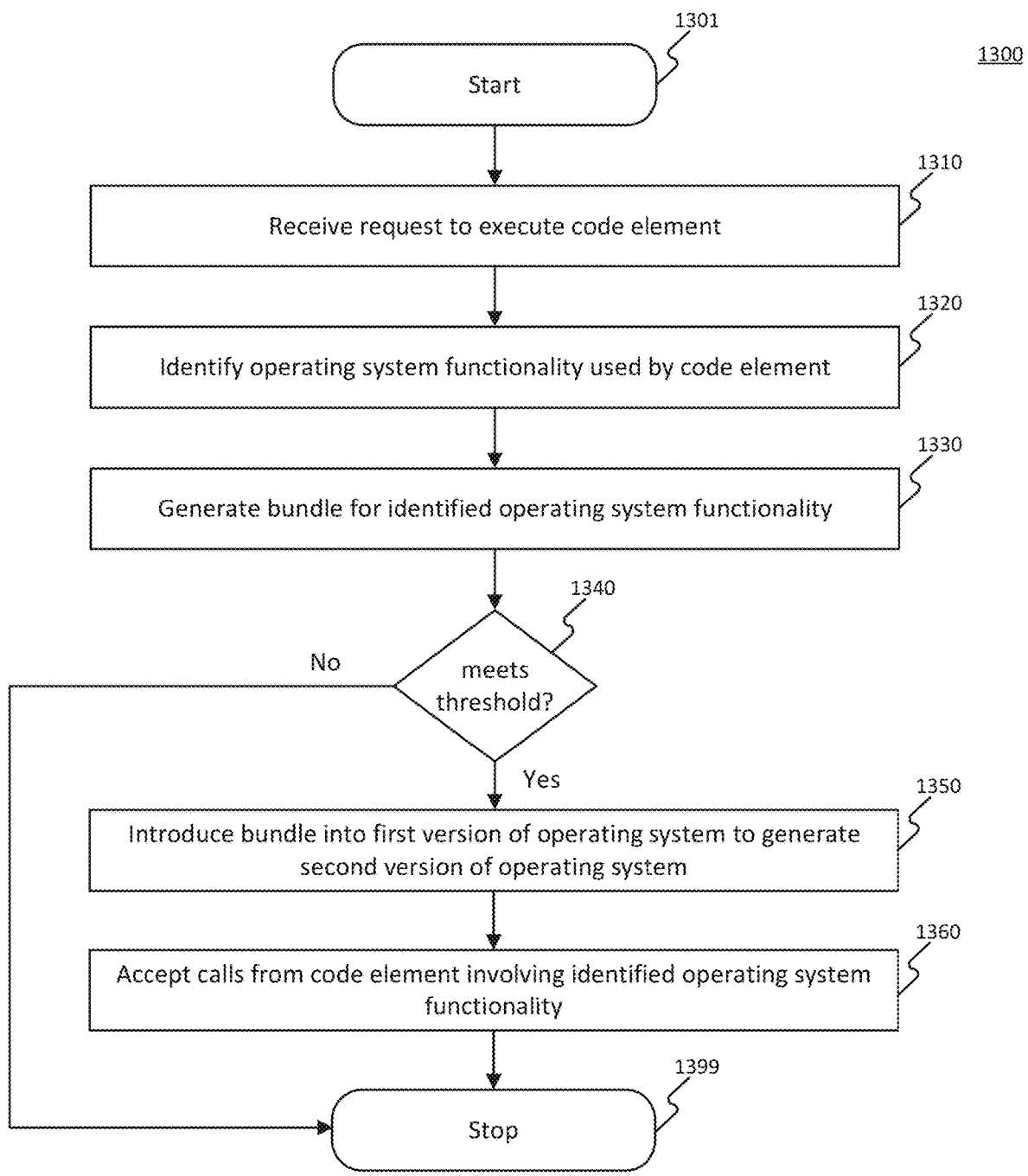
FIG. 13 is a flowchart depicting operations of an exemplary method for generating a dynamically mutable operating system, according to some embodiments of the present disclosure.

FIG. 13 is a flowchart depicting operations of an exemplary method for generating a dynamically mutable operating system, according to some embodiments of the present disclosure. The steps of method 1300 may be performed by code execution management system 100 for purposes of illustration. It will be appreciated that the illustrated method 1300 may be altered to modify the order of steps and to include additional steps.

In step 1310, code execution management system 100 may receive a request to execute a code element. Code execution management system 100 may receive an execution request as part of execution of an application. In some embodiments, code execution management system 100 may receive a request when an application including code elements (e.g., code elements 121 of FIG. 1) is updated. For example, code execution management system 100 may be part of a continuous integration system that determines the needs of the updated code elements and sets up an execution environment.

In step 1320, code execution management system 100 may identify operating system functionality used by code element. Code execution management system 100 may identify operating system functionality by identifying modules (e.g., modules 124) and bundles (e.g., bundles 125) included with an operating system accessed by a code element requested for execution of the code element.

In step 1330, code execution management system 100 may generate a bundle for identified operating system functionality. Code execution management system 100 may generate a bundle by packing various modules identified in step 1320 for an operating system functionality accessed by a code element. In some embodiments, code execution management system 100 may use an existing bundle of bundles 125 (as shown in FIG. 1) and modify it to generate a bundle for identified operating system functionality.

In step 1340, code execution management system 100 may determine if the bundle confidence score meets a threshold value. Code execution management system 100 may determine a confidence score based on the code element's impact on performance and security of an execution environment formed by underlying hardware and an instantiated operating system. Code execution management system 100 may use impact module 114 (as shown in FIG. 1) and threat security engine 115 (as shown in FIG. 1) to calculate an impact to performance and security of the execution environment, respectively.

In step 1350, code execution management system 100 may introduce a bundle into a first version of an operating system to generate second version of an operating system. Code execution management system may take a copy of an operating system that is part of the current execution environment and modify it to generate a second version of an operating system. Code execution management system may use generation engine 110 to generate a second version of an operating system.

In step 1360, code execution management system 100 may accept calls from a code element involving identified operating system functionality. Code execution management system 100 upon receiving calls for operating system functionality may direct them to the bundle of modules introduced in step 1350. In some embodiments, code execution management system 100 may only accept calls that are allowed by a wrapper surrounding code element. Code execution management system 100, upon completion of step 1360, completes (step 1399) executing method 1300.

Figure 14:
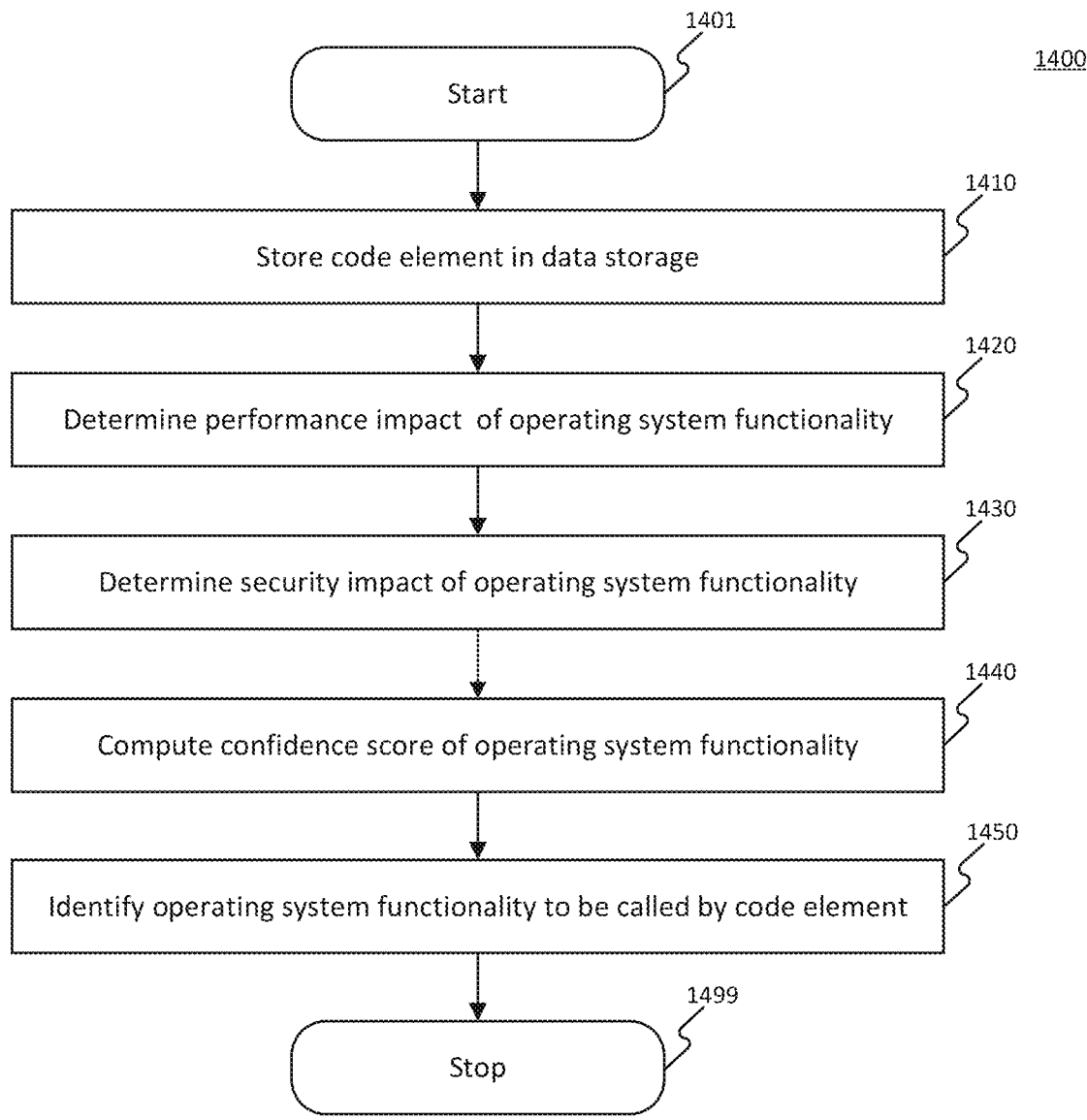
FIG. 14 is a flowchart depicting operations of an exemplary method for identifying bundles to include in a dynamically mutable operating system, according to some embodiments of the present disclosure.

FIG. 14 is a flowchart depicting operations of an exemplary method 1400 for identifying bundles to include in a dynamically mutable operating system, according to some embodiments of the present disclosure. The steps of method 1400 may be performed by code execution management system 100 for purposes of illustration. It will be appreciated that the illustrated method 1400 may be altered to modify the order of steps and to include additional steps.

In step 1410, code execution management system 100 may store code elements in data storage (e.g., repository 120 of FIG. 1). Code execution management system 100 may receive a code element from a user device (e.g., user devices 310 of FIG. 3). Code execution management system 100 may automatically receive a code element for storage from a version control system based on updates to a software application.

In step 1420, code execution management system 100 may determine a performance impact on operating system functionality. Code execution management system 100 may employ impact module 114 to determine the impact on the operating system's performance in providing functionality requested by a code element. Performance impact may depend on remaining modules initialized within an operating system that may not include functionality requested by a code element. Adding or removing such modules may impact performance of the operating system. For example, removing software modules related to unnecessary devices such as floppy disks may accelerate operating system core functions provided by core kernel modules, while removing modules related to a memory optimization device may introduce further performance overhead.

In some embodiments, a performance impact may depend on a module chosen for exposing functionality. Two modules providing the same functionality may impact operating system performance differently. For example, two modules providing functionality to securely access data from external servers may be implemented using SFTP and SCP protocols resulting in a different impact on the performance of an operating system.

In step 1430, code execution management system 100 may determine a security impact of operating system functionality. Code execution management system 100 may determine a security impact using threat security engine 115. Similar to performance impact determination in step 1420, two modules providing the same functionality may have different security impacts on an operating system.

In step 1440, code execution management system 100 may compute a confidence score of operating system functionality based on performance and a security impact on an operating system. A confidence score may also be based on an application and its developer. For example, a trusted developer application and its code elements may be given a higher confidence score even if it has a higher security impact on an operating system.

In step 1450, code execution management system 100 may identify operating system functionality to be called by a code element. Code execution management system 100 may review confidence scores to determine a level of access to operating system functionality. For example, an operating system may provide partial access to operating system functionality. For example, a code element's request to stream data at higher speeds may be partially allowed to reduce the performance impact on an operating system. Code execution management system 100, upon completion of step 1450, completes (step 1499) executing method 1400.

Various operations or functions are described herein, which may be implemented or defined as software code or instructions. Such content may be directly executable ("object" or "executable" form), source code, or difference code ("delta" or "patch" code). Software implementations of the embodiments described herein may be provided via an article of manufacture with the code or instructions stored thereon, or via a communication interface method to send data via the communication interface. A machine or computer readable storage medium may cause a machine to perform the functions or operations described and includes any mechanism that stores information in a form accessible by a machine (e.g., computing device, electronic system, and the like), such as recordable/non-recordable media (e.g., read only memory (ROM), random access memory (RAM), magnetic disk storage media, optical storage media, flash memory devices, and the like). A communication interface includes any mechanism that interfaces with any of a hardwired, wireless, optical, or similar, medium to communicate with another device, such as a memory bus interface, a processor bus interface, an Internet connection, a disk controller, and the like. The communication interface may be configured by providing configuration parameters and/or sending signals to prepare the communication interface to provide a data signal describing the software content. The communication interface may be accessed via one or more commands or signals sent to the communication interface.

The present disclosure also relates to a system for performing the operations herein. This system may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CDROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Embodiments of the present disclosure may be implemented with computer executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

Computer programs based on the written description and methods of this specification are within a software developer's skill. The various programs or program modules may be created using a variety of programming techniques. For example, program sections or program modules may be designed by means of JavaScript, Scala, Python, Java, C, C++, assembly language, or any such programming languages, as well as data encoding languages (such as XML, JSON, etc.), query languages (such as SQL), presentation-related languages (such as HTML, CSS, etc.) and data transformation language (such as XSL). One or more of such software sections or modules may be integrated into a computer system, non-transitory computer readable media, or existing communications software.

The words "comprising," "having," "containing," and "including," and other similar forms are intended to be equivalent in meaning and be interpreted as open ended, in that, an item or items following any one of these words is not meant to be an exhaustive listing of such item or items, or meant to be limited to only the listed item or items. In addition, the singular forms "a," "an," and "the" are intended to include plural references, unless the context clearly dictates otherwise.

Having described aspects of the embodiments in detail, it will be apparent that modifications and variations are possible without departing from the scope of aspects of the invention as defined in the appended claims. As various changes could be made in the above constructions, products, and methods without departing from the scope of aspects of the invention, it is indented that all matter contained in the above description and shown in the accompanying drawings shall be interpreted as illustrative and not in a limiting sense.

What is claimed is:

1. A non-transitory computer readable medium including instructions that, when executed by at least one processor, cause the at least one processor to perform operations for generation of a secure and dynamically mutable operating system, the operations comprising:

receiving a request to execute an application;

instantiating an operating system for execution of the application, wherein the operating system instantiation includes identifying one or more modules needed to execute the application, wherein the identified one or more modules include core kernel modules and operating system service modules that are dynamically plugged-in or unplugged based on the execution of the application;

assigning a separate memory space for each of the one or more modules, wherein each separate memory space is assigned a separate virtual address;

generating a unique cryptographic key for each of the one or more modules;

storing each virtual address and corresponding unique cryptographic key together; and encrypting each of the one or more modules using their corresponding unique cryptographic key.

2. The non-transitory computer readable medium of claim 1, wherein the one or more operating system service modules can be unplugged within a threshold period.

3. The non-transitory computer readable medium of claim 1, wherein instantiating the operating system for execution of the application further comprises executing each of the one or more modules as separate processes.

4. The non-transitory computer readable medium of claim 1, wherein identifying the one or more modules needed to execute the application further comprises:

identifying an operating system functionality required by the application; and generating a bundle for the identified operating system functionality.

5. The non-transitory computer readable medium of claim 3, wherein generating the bundle for the identified operating system functionality comprises generating the bundle on a just-in-time basis.

6. The non-transitory computer readable medium of claim 1, wherein the core kernel modules include default modules included in the instantiated operating system.

7. The non-transitory computer readable medium of claim 1, wherein the receipt of the request to execute the application includes a request to store updates to the application.

8. The non-transitory computer readable medium of claim 1, wherein the identification of the one or more modules needed for execution of the application is based on a confidence score.

9. The non-transitory computer readable medium of claim 1, wherein the core kernel modules and operating system service modules that are dynamically plugged-in or unplugged based on the execution of the application are dynamically plugged-in or unplugged based on an impact to performance of the operating system upon inclusion of the identified one or more modules.

10. The non-transitory computer readable medium of claim 1, wherein the core kernel modules and operating system service modules that are dynamically plugged-in or unplugged based on the execution of the application are dynamically plugged-in or unplugged based on an impact to security of the operating system upon inclusion of the identified one or more modules.

11. The non-transitory computer readable medium of claim 1, wherein an operating system service module of the operating system service modules auto-terminates.

12. The non-transitory computer readable medium of claim 1, wherein storing each virtual address and corresponding unique cryptographic key together further comprises storing the unique cryptographic key in association with the core kernel modules of the operating system.

13. The non-transitory computer readable medium of claim 1, wherein the operations further comprise:
    monitoring capabilities accessed by the executing application;
    determining accessed capabilities not identified during instantiation of the operating system, wherein the determined capabilities are determined based on the identified one or more modules of the operating system;
    analyzing the determined capabilities accessed by the executing application; and
    mitigating the determined capabilities, wherein the mitigation is based on the analysis of the determined capabilities.

14. A computer-implemented method for generation of a secure and dynamically mutable operating system, the method comprising:
    receiving a request to execute an application;
    instantiating an operating system for execution of the application wherein the operating system instantiation includes identifying one or more modules needed to execute the application, wherein the identified one or more modules include core kernel modules and operating system service modules that are dynamically plugged-in or unplugged based on the execution of the application;
    assigning a separate memory space for each of the one or more modules, wherein each separate memory space is assigned a separate virtual address;
    generating a unique cryptographic key for each of the one or more modules;
    storing each virtual address and corresponding unique cryptographic key together; and
    encrypting each of the one or more modules using their corresponding unique cryptographic key.

15. The method of claim 14, wherein the one or more operating system service modules can be unplugged within a threshold period.

16. The method of claim 14, wherein instantiating the operating system for execution of the application further comprises executing each of the one or more modules as separate processes.

17. The method of claim 14, wherein identifying the one or more modules needed to execute the application further comprises:
    identifying an operating system functionality required by the application; and
    generating a bundle for the identified operating system functionality.

18. The method of claim 14, wherein generating the bundle for the identified operating system functionality comprises generating the bundle on a just-in-time basis.

19. The method of claim 14, further comprising:
    monitoring capabilities accessed by the executing application;
    determining accessed capabilities not identified during instantiation of the operating system, wherein the determined capabilities are determined based on the identified one or more modules of the operating system;
    analyzing the determined capabilities accessed by the executing application; and
    mitigating the determined capabilities, wherein the mitigation is based on the analysis of the determined capabilities.

20. A secure and dynamic operating system generation system, comprising:
    one or more memory devices storing processor-executable instructions; and
    one or more processors configured to execute the instructions to cause the secure and dynamic operating system generation system to perform operations comprising:
        receiving a request to execute an application;
        instantiating an operating system for execution of the application, wherein the operating system instantiation includes identifying one or more modules needed to execute the application, wherein the identified one or more modules include core kernel modules and operating system service modules that are dynamically plugged-in or unplugged based on the execution of the application;
        assigning a separate memory space for each of the one or more modules, wherein each separate memory space is assigned a separate virtual address;
        generating a unique cryptographic key for each of the one or more modules;
        storing each virtual address and corresponding unique cryptographic key together; and
        encrypting each of the one or more modules using their unique corresponding cryptographic key.

* * * * *